US012492515B2

(12) United States Patent
Eum et al.

(10) Patent No.: US 12,492,515 B2
(45) Date of Patent: Dec. 9, 2025

(54) CURVE PORTION MOLD STRUCTURE FOR MANUFACTURING CURVED CONCRETE PANEL FOR MOUNTAIN RAILWAY RACK TRACK, AND CURVED CONCRETE PANEL MANUFACTURING METHOD USING THE SAME

(71) Applicant: KOREA RAILROAD RESEARCH INSTITUTE, Gyeonggi-do (KR)

(72) Inventors: Ki Young Eum, Gyeonggi-do (KR); Taehoon Kim, Gyeonggi-do (KR)

(73) Assignee: KOREA RAILROAD RESEARCH INSTITUTE, Gyeonggi-do (KR)

( * ) Notice: Subject to any disclaimer, the term of this patent is extended or adjusted under 35 U.S.C. 154(b) by 140 days.

(21) Appl. No.: 18/469,560

(22) Filed: Sep. 19, 2023

(65) Prior Publication Data

US 2024/0102252 A1 Mar. 28, 2024

(30) Foreign Application Priority Data

Sep. 23, 2022 (KR) ........................ 10-2022-0120746

(51) Int. Cl.
*B28B 7/02* (2006.01)
*E01B 29/00* (2006.01)

(52) U.S. Cl.
CPC ................ *E01B 29/00* (2013.01); *B28B 7/02* (2013.01)

(58) Field of Classification Search
CPC .......... E01B 29/00; B28B 7/02; B28B 7/0032
See application file for complete search history.

(56) References Cited

U.S. PATENT DOCUMENTS

| | | | |
|---|---|---|---|
| 4,433,717 | A | 2/1984 | Suzuki et al. |
| 5,988,519 | A | 11/1999 | Jordie |

FOREIGN PATENT DOCUMENTS

| | | | | | |
|---|---|---|---|---|---|
| KR | 2014109732 | A | * | 9/2014 | |
| KR | 2017107285 | A | * | 9/2017 | ......... B28B 11/0845 |
| KR | 2019088168 | A | * | 7/2019 | ........... E04G 11/065 |
| KR | 2380975 | B1 | * | 4/2022 | |

* cited by examiner

*Primary Examiner* — Jacob T Minskey
*Assistant Examiner* — Virak Nguon
(74) *Attorney, Agent, or Firm* — JCIPRNET

(57) ABSTRACT

The present disclosure provides a curve portion mold structure for manufacturing a curved concrete panel for a mountain railway rack track and a curved concrete panel manufacturing method using the same in which, by forming a curve portion mold structure made of an outer mold and an inner mold to manufacture a curved concrete panel for a mountain railway rack track, the curvature of the outer mold and the curvature of the inner mold can be simultaneously adjusted, and a curve can be implemented by a difference in pressure introduction of a screw jack at a side surface of the outer mold. Also, by dividing a bottom plate of the outer mold to form the bottom of the curved concrete panel, application to various forms of curvatures of the curved concrete panel is possible, and by implementing a curvature by coupling between blocks using a fastening pin in an inner mold made of an intermediate block, an end block, and an impact-absorbing block, the curved concrete panel for a mountain railway rack track can be easily manufactured.

10 Claims, 20 Drawing Sheets a)

b)

a)

b)

CURVE PORTION MOLD STRUCTURE FOR MANUFACTURING CURVED CONCRETE PANEL FOR MOUNTAIN RAILWAY RACK TRACK, AND CURVED CONCRETE PANEL MANUFACTURING METHOD USING THE SAME

CROSS-REFERENCE TO RELATED APPLICATION

This application claims priority to and the benefit of Korean Patent Application No. 10-2022-0120746, filed on Sep. 23, 2022, the disclosure of which is incorporated herein by reference in its entirety.

BACKGROUND

1. Field of the Invention

The present disclosure relates to manufacturing a curved concrete panel for a mountain railway rack track, and more particularly, to a curve portion mold structure for manufacturing a curved concrete panel for a mountain railway rack track and a curved concrete panel manufacturing method using the same in which, when manufacturing a curved concrete panel for a mountain railway rack track, a curve portion mold structure is configured so that a curvature of an outer mold and a curvature of an inner mold can be simultaneously adjusted.

2. Discussion of Related Art

Generally, because railway vehicles are made to travel on special passages, that is, rails which are tracks, instead of traveling on general roads for cars, even for different types of railway vehicles, the basic structures thereof are the same. A railway vehicle is made up of a vehicle wheel portion, a chassis portion, a vehicle body portion, and accessories.

Such railway vehicles travel on tracks laid in flat areas but may also travel on tracks laid in relatively steep mountain areas. A track for railway vehicles traveling in steep mountain areas is referred to as a mountain railway.

FIG. 1A is a picture of a typical mountain railway, and FIG. 1B is a view illustrating a mountain railway traveling system that includes a mountain railway driving device.

Since wheels of a railway vehicle and a rail are all made of metal, adhesion is lower than adhesion between a general road and a vehicle traveling thereon. Thus, when a railway vehicle travels in a steep area such as a mountain railway, as illustrated in FIG. 1A, because a railway vehicle 11 slides to a lower portion of a rail 12 in many cases and traveling of the railway vehicle 11 is not easy, a rack 13 is installed in a longitudinal direction of the rail at a central portion of the rail 12 in order to prevent sliding of the railway vehicle 11.

Also, as illustrated in FIG. 1B, a pinion 14 that corresponds to the rack 13 is installed on the railway vehicle 11 to prevent the railway vehicle 11 from sliding downward and allow the railway vehicle 11 to travel stably in a steep mountain area. That is, in the mountain railway traveling system, the railway vehicle 11 can be prevented from being pushed downward by installing the rack 13, which is a cogged rail, on a track installed in a steep area and installing the pinion 14, which is a cogwheel, on a lower portion of the railway vehicle.

Meanwhile, FIG. 2A is a view illustrating a mountain railway rack track in detail, and FIG. 2B is a view for describing an operation of a rack and a pinion in the mountain railway rack track illustrated in FIG. 2A.

Referring to FIG. 2A, the mountain railway rack track may be configured to include a precast concrete (PC) panel, a rail, a rack, a rack fastening anchor, an elastic filler, and a drain pipe but is not limited thereto.

Here, as illustrated in FIG. 2B, a pinion that corresponds to a rack is installed on a railway vehicle to prevent the railway vehicle from sliding downward and allow the railway vehicle to travel stably in a steep mountain area.

In other words, the mountain railway traveling system is a rack-and-pinion type traveling system in which a rack is installed in a longitudinal direction of a rail at the center of a mountain railway track, and a pinion, in addition to wheels, is used in a railway vehicle to prevent a slip phenomenon of the railway vehicle while the railway vehicle travels by rubbing against the rail in a gradient section of a mountain area and to add propulsion.

Meanwhile, rail-embedded tracks are generally used in light railroads, and some are used at crossings with roads. Such a rail-embedded track is a track structure in which all parts except for the top surface of the rail, that is, a contact surface with a wheel, are wrapped and covered, and generally, sleepers and fasteners are not used.

As features of the rail-embedded track, there are many advantages that there is no additional material to secure the gauge, continuous elastic support is possible, lifting of the rail does not occur, the rail surface is surrounded, thus having no rust and having a long service life, the rail is supported from the bottom and the front such that stress of the rail support is low and a service life thereof is long, and elasticity is maintained in the vertical and transverse directions.

In the case of such a rail-embedded track, a formwork is manufactured, concrete mortar is injected thereinto from the top and cured for a certain period of time, and then the formwork is removed to manufacture a rail-embedded concrete block.

Meanwhile, as a related art of the rail-embedded track, Korean Patent Registration No. 10-1410954 discloses "Formwork apparatus for manufacturing precast concrete block for rail-embedded track," which will be described in detail below with reference to FIGS. 3A, 3B, 4, 5A, and 5B.

FIG. 3A is a view illustrating the overall configuration of the formwork apparatus for manufacturing a precast concrete block for a rail-embedded track according to the related art, and FIG. 3B is a perspective view of an inner frame body illustrated in FIG. 3A.

Referring to FIGS. 3A and 3B, the formwork apparatus for manufacturing a precast concrete block for a rail-embedded track according to the related art is configured to include an outer frame 20 into which concrete mortar is injected to form a block and an inner frame body A installed at a bottom surface of the outer frame 20 and having a rail groove formed in a space formed therein.

The inner frame body A is configured to include: a main body in which a lower plate and a sidewall are separably coupled, both ends and an upper portion are open, and a space is formed; a partition coupled to an inner portion of the main body to divide the space; and a supporter coupled to the space while supporting the lower plate and the sidewall.

The outer frame 20 has a wall formed at a side surface, a bottom surface formed at a lower portion, and an upper portion formed to be open so that a rectangular space is formed therein. By injecting concrete mortar into the outer frame 20 and curing the concrete mortar, a precast concrete block 60 in the shape of a rectangular plate can be formed.

The inner frame body A is provided so that two inner frame bodies A constitute one group, and the two inner frame bodies A are spaced apart from each other on a bottom surface of the outer frame 20 to fit the size of a rail.

Therefore, as illustrated in FIG. 3B, an empty space 41 is formed in the inner frame body A, and due to the space 41, a rail groove in which a rail may be mounted can be formed in the precast concrete block 60 illustrated in FIG. 4 which is formed later.

Specifically, as illustrated in FIG. 3B, the inner frame body A is configured to include: a main body in which a lower plate 43 and a sidewall 42 are separably coupled, both ends and an upper portion are open, and the space 41 is formed; a partition 47 coupled to an inner portion of the main body to divide the space 41; and a supporter 46 coupled to the space 41 while supporting the lower plate 43 and the sidewall 42.

The main body includes the lower plate 43 and the sidewall 42 coupled to both sides of the lower plate 43 and is formed in a U-shape.

Here, a circular through-hole is formed in the lower plate 43, a detachment member is coupled to the through-hole, and a plurality of steps are formed on the lower plate 43 to allow the partition 47 to be mounted.

Also, the partition 47 is for dividing the main body into certain sections. A movement hole is formed in the partition 47 to allow movement of concrete mortar, and a first support stand is formed at both sides of a lower portion of a front surface of the partition 47 so that the first support body 44 is coupled and supported.

A second support stand is formed between the first support stands, a fixing bolt is coupled to the second support stand so that the second support stand is coupled to the step, and a third support stand is formed at a lower portion of a rear surface of the partition 47 and is fixed to the step by screw coupling. In this way, the partition 47 can be firmly supported in a vertical state.

Also, FIG. 4 is a view sequentially illustrating operations of a manufacturing process using the formwork apparatus for manufacturing a precast concrete block for a rail-embedded track according to the related art, and FIG. 5, a) and b) are views illustrating a precast concrete block for a rail-embedded track that is manufactured using the formwork apparatus illustrated in FIG. 3A.

As illustrated in FIG. 4, in the manufacturing process using the formwork apparatus for manufacturing a precast concrete block for a rail-embedded track according to the related art, first, as illustrated in a) of FIG. 4, a plurality of inner frame bodies A are coupled to the bottom surface of the outer frame 20, a connecting member B is coupled to seal a seam formed at a connecting portion of each inner frame body A, and a sealing material is injected into an outer surface of the connecting member B to seal the seam. Here, the plurality of inner frame bodies A are coupled in a form in which they are put upside down, and a space is formed therein.

Next, as illustrated in b) of FIG. 4, concrete mortar is injected into the outer frame 20 and cured for a certain period of time.

Next, as illustrated in c) of FIG. 4, after curing is completed, the outer frame is reversed and flipped, and then, as illustrated in d) of FIG. 4, the outer frame 20 is removed.

Next, as illustrated in e) of FIG. 4, the inner frame bodies A are removed to complete the precast concrete block 60 for a rail-embedded track.

Here, when the first support body 44 is tightened, a lower nut and a support plate of the first support body 44 come in close contact with the lower plate 43, the sidewall 42 floats, and the inner frame body A is detached from a concrete formed product CR, and by manipulating a second support body 45 to operate the detachment member, the inner frame body A is detached from the concrete formed product CR. In this way, the removal of the inner frame body A may be facilitated.

That is, a hexagonal bolt is loosened so that a length of the hexagonal bolt is appropriate, and then the second support body 45 is tightened so that a front end pushes a movement plate, and due to a repulsive force caused by the movement plate pushing the concrete formed product CR, the lower plate 43 may be detached from the concrete formed product CR.

By removing the inner frame bodies A in this way, the precast concrete block 60 is finally completed.

Also, as illustrated in FIG. 5, a) and b), by putting only one inner frame body A in the outer frame 20, injecting concrete, and then removing the inner frame body A, precast concrete blocks 20*a* and 20*b* for a rail-embedded track may be formed in separate forms.

Accordingly, two precast concrete blocks for a rail-embedded track are arranged as one group to construct a rail.

FIG. 5, a) shows a curved precast concrete block 20*a* for a rail-embedded track, and FIG. 5, b) shows a precast concrete block 20*b* for a rail-embedded track that has a plate shape and has two rails formed by injecting concrete into the outer frame 20 while two inner frame bodies A are put thereon and then removing the inner frame bodies A.

In other words, in the case of the formwork apparatus for manufacturing a precast concrete block for a rail-embedded track according to the related art, an outer frame is provided, and inner frame bodies for forming a rail groove inside the precast concrete block are configured, and by removing the inner frame bodies later, a concrete track is formed to form a concrete track bed in the form in which a rail of a general railroad is embedded.

According to the formwork apparatus for manufacturing a precast concrete block for a rail-embedded track according to the related art, by curing concrete by flipping the formwork upside down so that an upper surface of the finally-extracted precast concrete block for a rail-embedded track faces downward, the density of the upper surface of the precast concrete block for a rail-embedded track that is finally extracted by removing the formwork after the curing process can be significantly increased compared to the density of a lower portion thereof, and thus durability can be improved.

Also, because it is easy to form a precast concrete block for a rail-embedded track that has a curvature to be applied to a curved section, man-hours can be significantly reduced.

Meanwhile, Korean Patent Publication No. 2019-88168 discloses "Curvature-adjustable concrete structure formwork," which will be described below with reference to FIG. 6, a) and b).

FIG. 6, a) is a cross-sectional view illustrating a state in which a curved formwork is manufactured by utilizing the curvature-adjustable concrete structure formwork according to the related art, and FIG. 6, b) is a perspective view of the curved formwork.

Referring to FIG. 6, a) and b), a curved formwork 70 manufactured by utilizing the curvature-adjustable concrete structure formwork according to the related art may include: a bendable flat plate 71; a pair of end frames 72 coupled to rear surfaces of both ends of the flat plate 71; intermediate frames 73 spaced apart from each other and coupled to a rear surface of the flat plate 71 between the pair of end frames 72;

bolt fixing devices 74 coupled to the rear of the end frames 72 and the intermediate frames 73; and two or more columns of curvature adjustment bolts 75 coupled between the bolt fixing device 74 of the end frame 72 and the bolt fixing device 74 of the intermediate frame 73 and between the bolt fixing device 74 of the intermediate frame 73 and the bolt fixing device 74 of another intermediate frame 73 so that a length of the curvature adjustment bolts 75 is adjustable to adjust a curvature of the flat plate 71.

The flat plate 71 is bendable to form various curvatures and may have elasticity. The flat plate 71 may be manufactured in an appropriate size in consideration of transportation, assembly, or the like.

The pair of end frames 72 may be coupled to the rear surfaces of both ends of the flat plate 71. The end frame 72 may have a quadrangular shape formed of a pair of second vertical plates 72*a* and a pair of second horizontal plates 72*b*.

The intermediate frame 73 may include a pair of coupling plates 73*a*, a pair of inclined plates 73*b*, a pair of vertical plates 73*c*, and a pair of horizontal plates 73*d*.

The pair of coupling plates 73*a* may be coupled by welding or the like to the rear surface of the flat plate 71 so that the pair of coupling plates 73*a* have a certain separation distance therebetween. An interval between the pair of inclined plates 73*b* may be gradually reduced toward the rear after the pair of inclined plates 73*b* are bent from inner sides of the pair of coupling plates 73*a*.

Here, a right-angled C-shaped or quadrilateral angle 73*e* may be installed in and coupled to a right-angled C-shaped inner groove formed by the pair of vertical plates 73*c* and the pair of horizontal plates 73*d* of the intermediate frame 73.

The bolt fixing device 74 coupled to the intermediate frame 73 may include a pair of fixing plates 74*a* coupled to the intermediate frame 73 and a hinge pin 74*b* configured to connect the pair of fixing plates 74*a* to each other.

The fixing plate 74*a* may have a groove formed therein to allow a right-angled C-shaped rear portion, formed by the pair of vertical plates 73*c* and the pair of horizontal plates 73*d* of the intermediate frame 73, to be inserted and coupled by welding or the like. Therefore, by the rear portion of the intermediate frame 73 being inserted into and coupled to the fixing plate 74*a*, the intermediate frame 73 can be firmly coupled, and rigidity of the intermediate frame 73 can be increased. The hinge pin 74*b* may connect the pair of fixing plates 74*a*, coupled to be spaced a predetermined distance apart from the intermediate frame 73, to each other, and the curvature adjustment bolt 75 may be rotatably coupled to the hinge pin 74*b*.

The curvature adjustment bolt 75 may include a body portion 75*a* and a connecting portion 75*b*.

The body portion 75*a* may have a screw hole formed at both inner sides in the longitudinal direction. The connecting portion 75*b* may have a screw portion formed at one side and a rotary ring formed at the other side, and the rotary ring may be rotatably coupled to the hinge pin 74*b* of the bolt fixing device 74.

The curvature-adjustable concrete structure formwork according to the related art is installed at both sides, and simultaneously installed at front, rear, left, and right sides to manufacture a concrete structure having a necessary size and shape.

In other words, in the case of the curvature-adjustable concrete structure formwork according to the related art, an intermediate side frame is provided at an outer surface of a flat plate formwork, a bolt fixing device is provided at an outer peripheral surface of the intermediate side frame, and a hinge pin is provided at the bolt fixing device to allow a curvature adjustment bolt to be connected so that the curvature is assigned to the flat plate formwork as the length of the curvature adjustment bolt is adjusted.

In the case of the curvature-adjustable concrete structure formwork according to the related art, by coupling a pair of end frames to both ends of a bendable flat plate, coupling intermediate frames to be spaced apart from each other between both end frames, and coupling a curvature adjustment bolt to be connected to the rear of the end frames and the intermediate frames, the curvature-adjustable concrete structure formwork can be applied to any of a curved concrete structure and a linear concrete structure, the curvature of the curvature-adjustable concrete structure formwork can be adjusted to various curvatures, and the curvature-adjustable concrete structure formwork can be repeatedly reused.

Meanwhile, as another related art, Korean Patent Publication No. 2014-109732 discloses "Method of manufacturing rail-embedded concrete block having three-dimensional shape and embedded railroad track construction method using rail-embedded concrete block manufactured by the method," in which a lower mold, a side mold, a reaction force bar, a pressure control portion, and an end mold are included, and the pressure control portion consists of a pitch control portion, a jackscrew, a jack fixing portion, a pin, and a roller, and may, through pressure control, adjust a curvature of the side mold to form a curvature of a track.

As still another related art, "Precast curved track manufacturing apparatus and manufacturing method thereof" is disclosed. A rail-embedded concrete block manufacturing method is disclosed in which gradient and cant are surveyed to match horizontal alignment, vertical alignment, and transverse alignment of the site where a rail-embedded track is installed, a first formwork and a second formwork are installed and concrete is poured therein, a slope is controlled through cant control, and a three-dimensional concrete block can be manufactured in an upside down shape.

Meanwhile, according to the related art, as described above, a rail-embedded concrete track bed formwork configuration is disclosed to allow a rail to be embedded, and a formwork configuration that adjusts a curvature of a member using members such as a hinge pin and a curvature adjustment bolt is disclosed to assign a curvature to a structure.

However, in the case of a curve portion mold for manufacturing a curved concrete panel for a mountain railway rack track, not only the curvature of an outer mold, but also the curvature of an inner mold corresponding to curvature adjustment of the outer mold, that is, an inner mold for blockout formation for rail and rack installation, should be adjusted, and accordingly, when manufacturing a curved concrete panel for a mountain railway rack track, a curve portion mold that allows the curvature of the outer mold and the curvature of the inner mold to be simultaneously adjusted is necessary.

RELATED ART DOCUMENTS

Patent Documents (Patent Document 0001) Korean Patent Registration No. 10-1410954 (Date of Registration: Jun. 17, 2014), Title of Disclosure: "Formwork apparatus for manufacturing precast concrete block for rail-embedded track"

(Patent Document 0002) Korean Patent Registration No. 10-2171763 (Date of Registration: Oct. 23, 2020), Title of Disclosure: “Rail-embedded track formwork apparatus”

(Patent Document 0003) Korean Patent Publication No. 2019-88168 (Date of Publication: Jul. 26, 2019), Title of Disclosure: “Curvature-adjustable concrete structure formwork”

(Patent Document 0004) Korean Patent Publication No. 2017-0107285 (Date of Publication: Sep. 25, 2017), Title of Disclosure: “Precast curved track manufacturing apparatus and manufacturing method thereof”

(Patent Document 0005) Korean Patent Publication No. 2014-109732 (Date of Publication: Sep. 16, 2014), Title of Disclosure: “Method of manufacturing rail-embedded concrete block having three-dimensional shape and embedded railroad track construction method using rail-embedded concrete block manufactured by the method”

SUMMARY OF THE INVENTION

The present disclosure is directed to providing a curve portion mold structure for manufacturing a curved concrete panel for a mountain railway rack track and a curved concrete panel manufacturing method using the same in which, by forming a curve portion mold structure made of an outer mold and an inner mold to manufacture a curved concrete panel for a mountain railway rack track, the curvature of the outer mold and the curvature of the inner mold can be simultaneously adjusted, and a curve can be implemented by a difference in pressure introduction of a screw jack at a side surface of the outer mold.

The present disclosure is also directed to providing a curve portion mold structure for manufacturing a curved concrete panel for a mountain railway rack track and a curved concrete panel manufacturing method using the same in which, by dividing a bottom plate of an outer mold to form a bottom of a curved concrete panel, application to various forms of curvatures of a curved concrete panel is possible.

The present disclosure is also directed to providing a curve portion mold structure for manufacturing a curved concrete panel for a mountain railway rack track and a curved concrete panel manufacturing method using the same in which a curvature can be implemented by coupling between blocks using a fastening pin in an inner mold made of an intermediate block, an end block, and an impact-absorbing block.

The present disclosure provides a curve portion mold structure for manufacturing a curved concrete panel for a mountain railway rack track, the curve portion mold structure including: an outer mold made of a bottom plate mold and a sidewall mold and in which the bottom plate mold is disposed to be divided; an inner mold disposed on the bottom plate mold of the outer mold to form left and right rail installation blockouts and a rack installation blockout of the curved concrete panel; a side screw jack installed at a side surface of the sidewall mold of the outer mold on a worktable for manufacturing the curved concrete panel and configured to implement a curve of the sidewall mold by adjusting an introduced pressure; and a bottom plate slope adjustment device configured to adjust a slope by being attached to a bottom surface of the bottom plate mold of the outer mold to form a bottom of the curved concrete panel, wherein a curvature of the outer mold and a curvature of the inner mold are simultaneously adjusted, and the curvature of the inner mold is adjusted by connecting an intermediate block, an end block, and an impact-absorbing block of the inner mold and absorbing a change in an angle due to the curvature.

Here, the curve may be implemented by a difference in pressure introduction of the side screw jack at the side surface of the outer mold.

Here, by dividing the bottom plate mold of the outer mold to form the bottom of the curved concrete panel, application to various forms of curvatures of the curved concrete panel is possible.

Here, the outer mold may include: the bottom plate mold disposed to be divided for application to various forms of curvatures; and the sidewall mold disposed at both sides of a sidewall and whose side slope is adjusted by the side screw jack.

Here, the bottom plate mold may include: an end bottom plate mold disposed at both side ends while having a fixed size; an intermediate bottom plate mold disposed at an intermediate portion while having a fixed size; and a variable bottom plate mold to which a variable size is applied according to the curvature of the curved concrete panel.

Here, the side screw jack may introduce a pressure to implement a curve with a minimum radius of curvature of 10 m at the side surface of the sidewall mold of the outer mold.

Here, the bottom plate slope adjustment device may adjust the slope of the bottom plate mold of the outer mold and implement a slope (cant) of 8% at maximum.

Here, the inner mold may include: a left rail installation convex portion disposed on the bottom plate mold to form a left rail installation blockout of the curved concrete panel; a right rail installation convex portion disposed on the bottom plate mold to form a right rail installation blockout of the curved concrete panel; and a rack installation convex portion disposed between the left rail installation convex portion and the right rail installation convex portion to form a rack installation blockout of the curved concrete panel.

Here, each of the left rail installation convex portion, the right rail installation convex portion, and the rack installation convex portion may include: an intermediate block formed of a steel material and disposed at an intermediate portion; an end block formed of a steel material and disposed at an end; and an impact-absorbing block formed of a rubber material and inserted between the blocks, wherein the curvature of the inner mold may be adjusted by connecting the blocks and absorbing a change in an angle due to the curvature of the inner mold.

Here, the intermediate block, the end block, and the impact-absorbing block may each have a fastening hole formed therein, and the blocks may be connected through a fastening pin.

Meanwhile, as another means for achieving the above-described objectives, the present disclosure provides a curved concrete panel manufacturing method using a curve portion mold structure for a mountain railway rack track, the curved concrete panel manufacturing method including: a) mounting sidewall molds of an outer mold on a worktable to form a curve portion mold structure made of the outer mold and an inner mold; b) implementing a side slope of the sidewall mold of the outer mold while adjusting an introduced pressure of a side screw jack; c) disposing a bottom plate mold of the outer mold to be divided between the sidewall molds to form a bottom of the curved concrete panel; d) disposing inner blocks for forming left and right rail installation blockouts and a rack installation blockout of the curved concrete panel on the bottom plate mold of the outer mold; e) adjusting a slope of a bottom plate by a bottom plate slope adjustment device; f) pouring concrete in a curve portion mold, in which the outer mold and the inner mold are coupled, and curing the concrete; and g) reversing and then removing the curve portion mold structure to manufacture the curved concrete panel, wherein a curvature of the outer mold and a curvature of the inner mold are simultaneously adjusted, and the curvature of the inner mold is adjusted by connecting an intermediate block, an end block, and an impact-absorbing block of the inner mold and absorbing a change in an angle due to the curvature.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
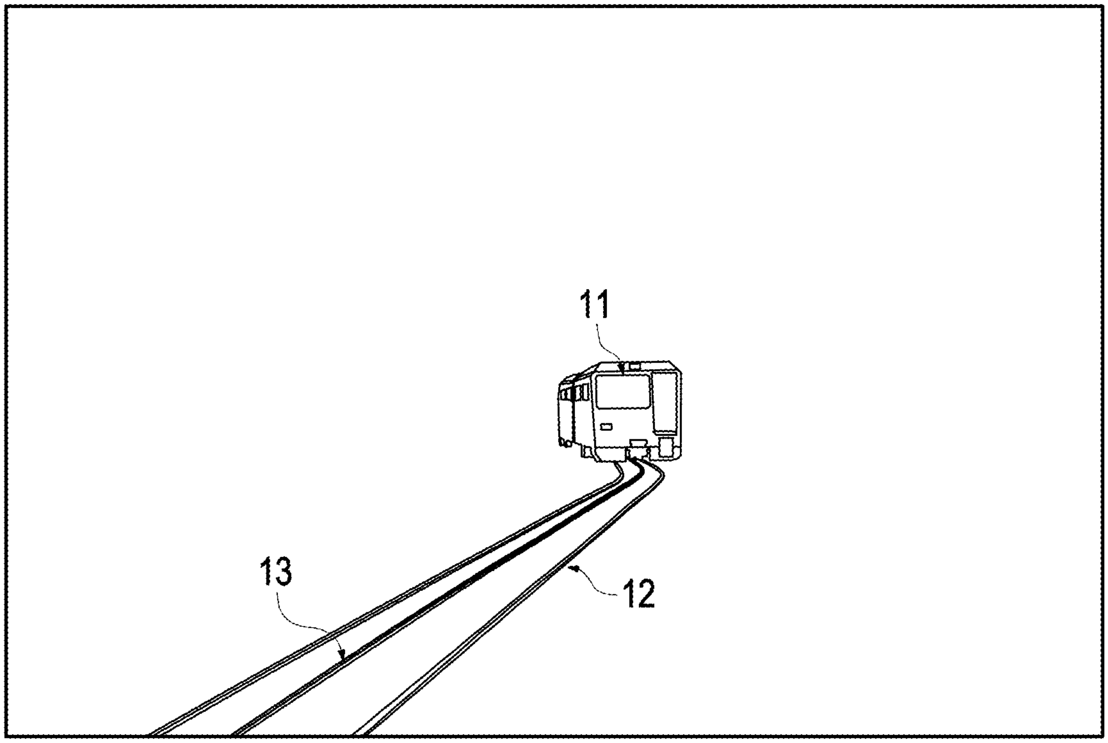
FIG. 1A is a picture of a typical mountain railway.
Figure 1B:
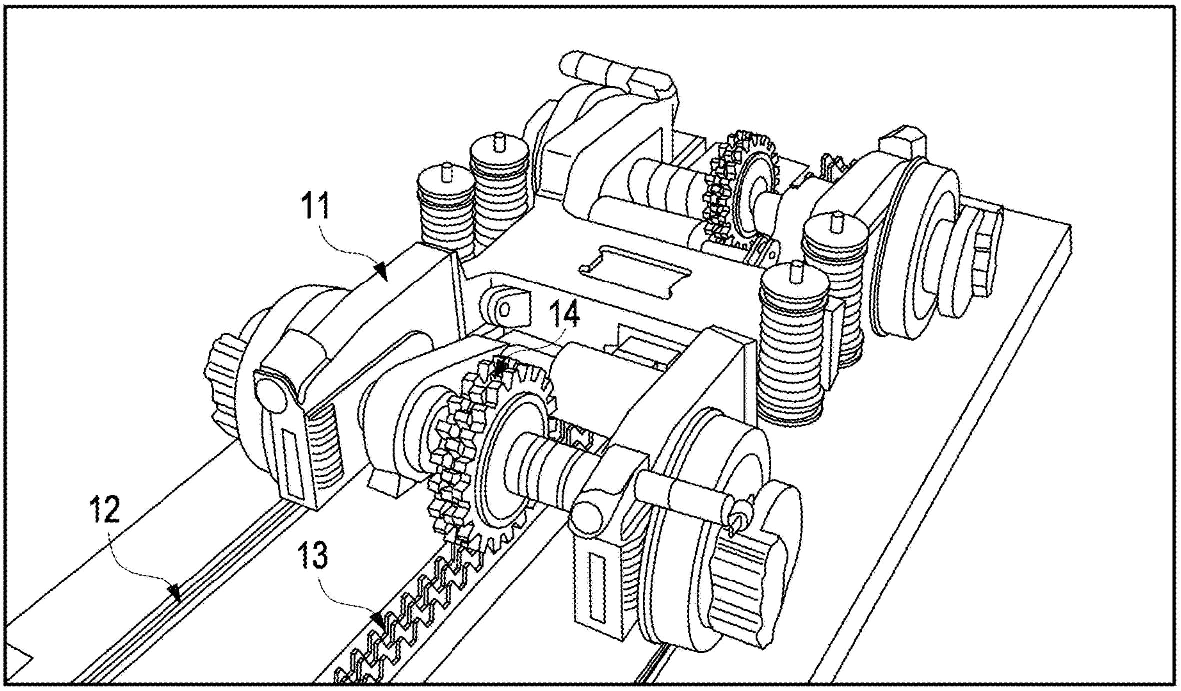
FIG. 1B is a view illustrating a mountain railway traveling system that includes a mountain railway driving device.
Figure 2A:
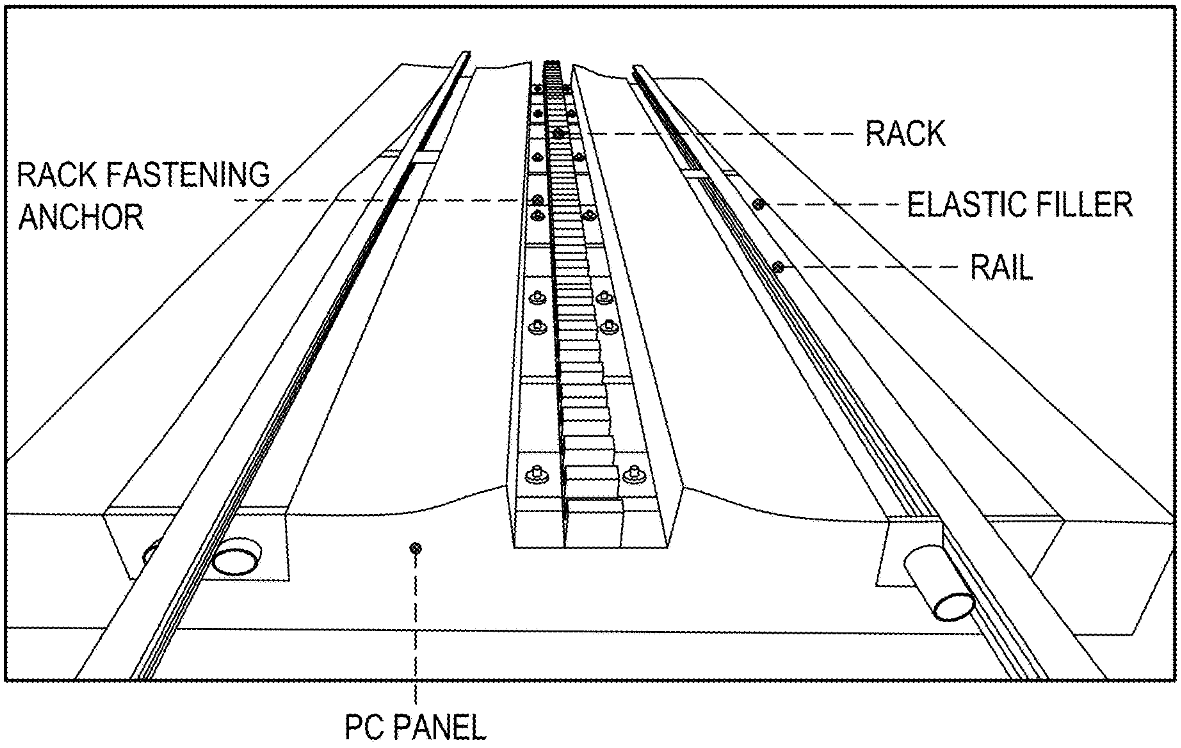
FIG. 2A is a view illustrating a mountain railway rack track in detail.
Figure 2B:
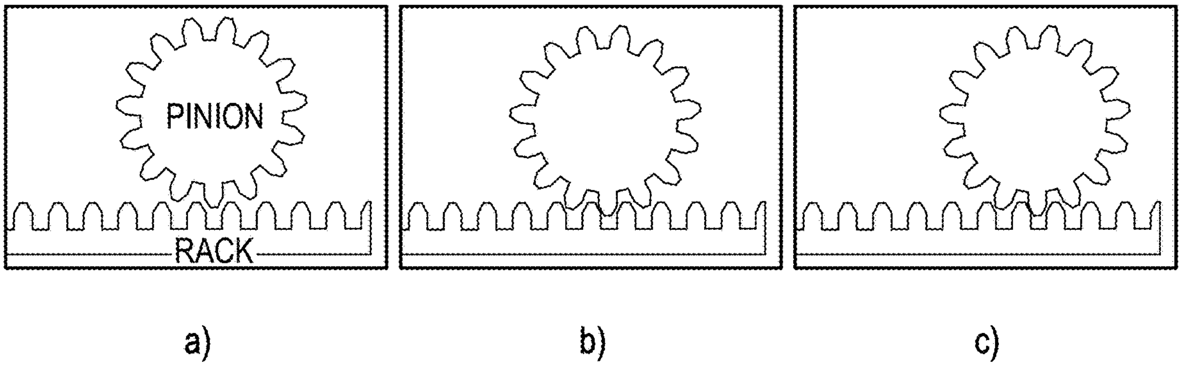
FIG. 2B is a view for describing an operation of a rack and a pinion in the mountain railway rack track illustrated in FIG. 2A.
Figure 3A:
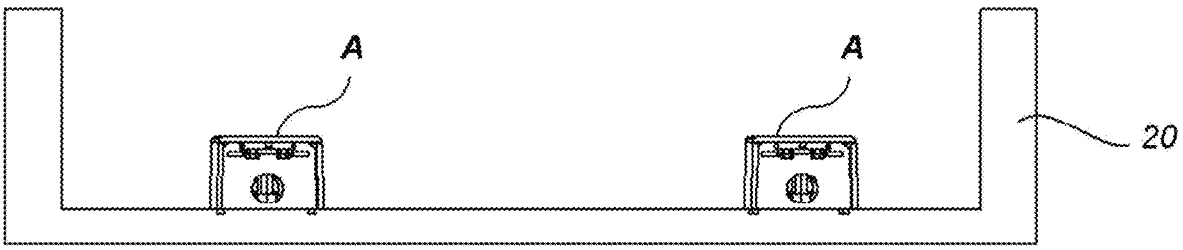
FIG. 3A is a view illustrating the overall configuration of a formwork apparatus for manufacturing a precast concrete block for a rail-embedded track according to the related art.
Figure 3B:
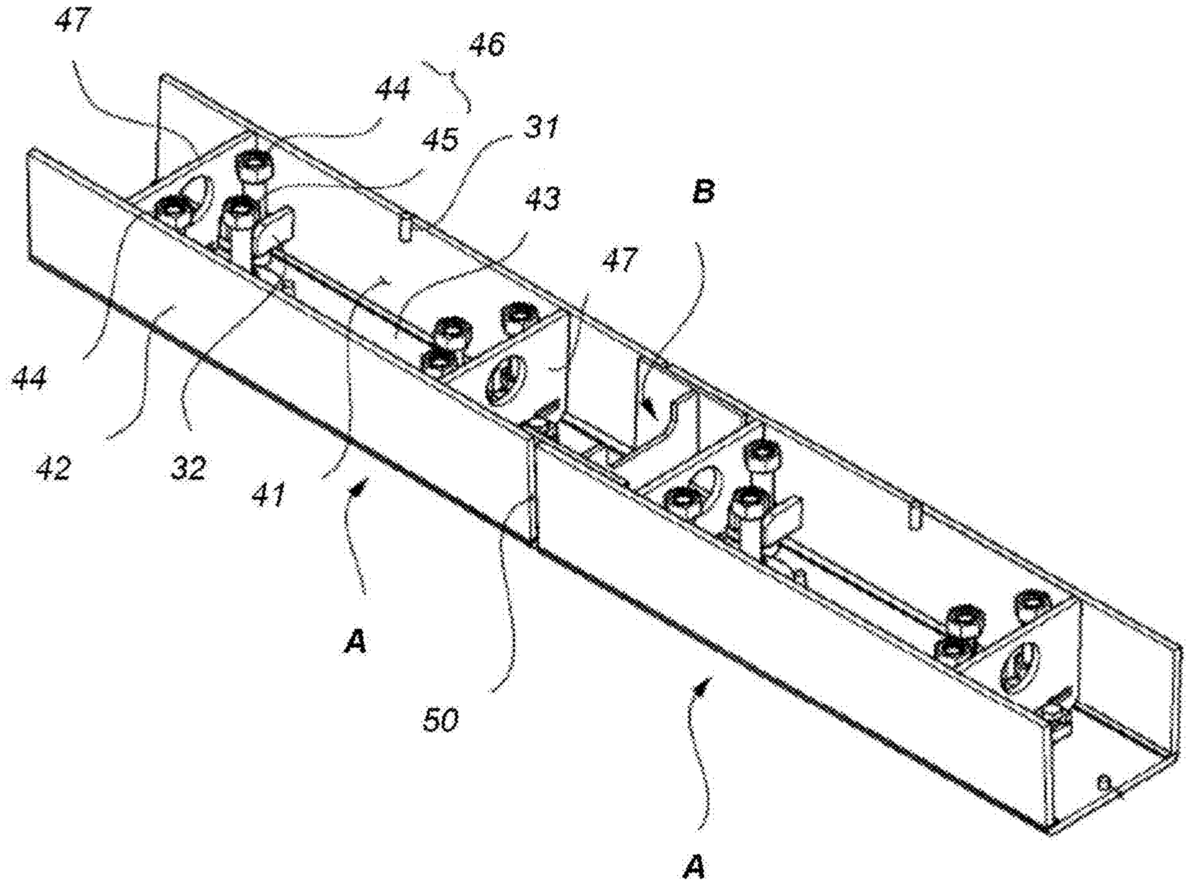
FIG. 3B is a perspective view of an inner frame body illustrated in FIG. 3A.
Figure 4:
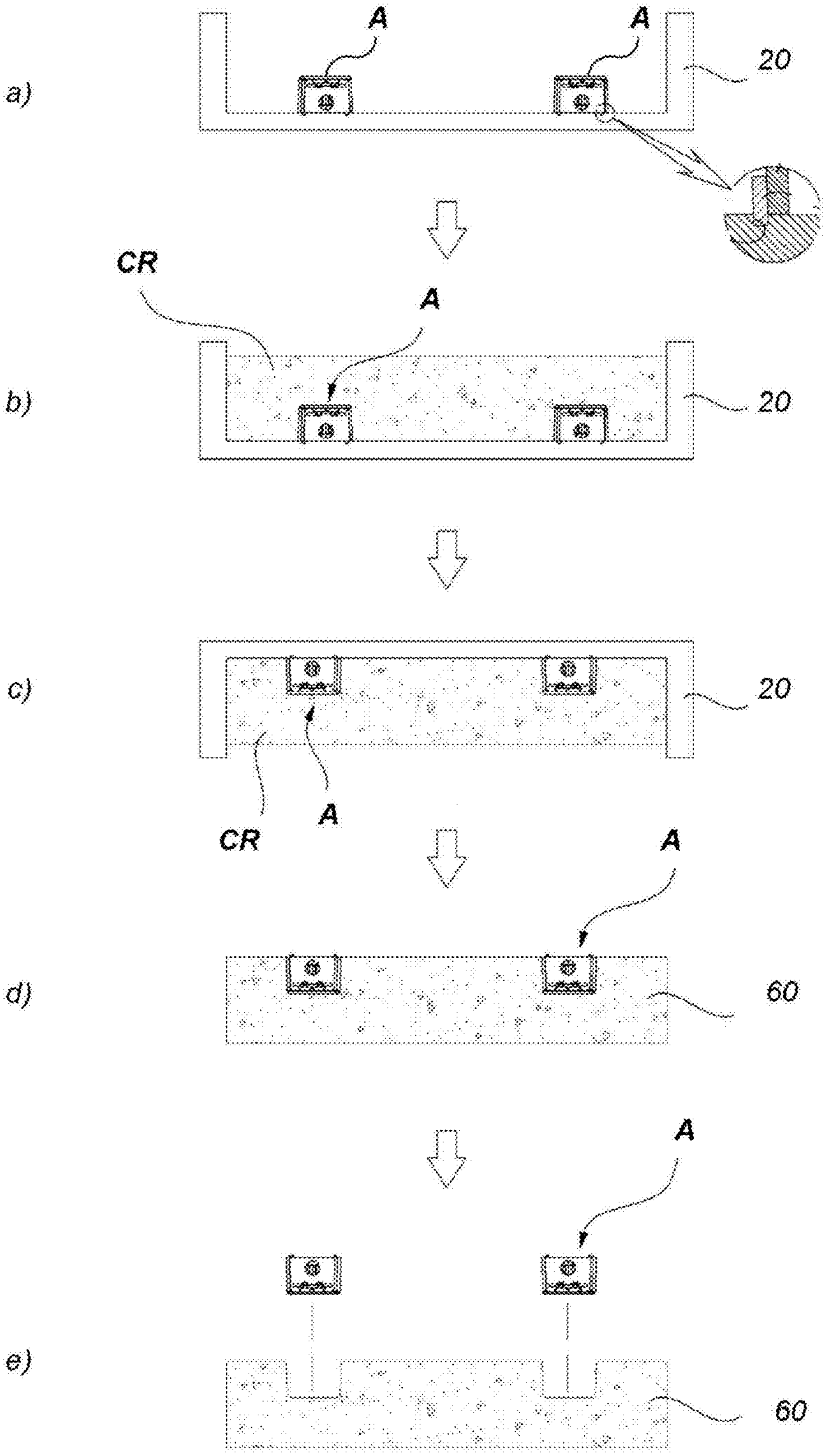
FIG. 4 is a view sequentially illustrating operations of a manufacturing process using the formwork apparatus for manufacturing a precast concrete block for a rail-embedded track according to the related art.
Figure 5:
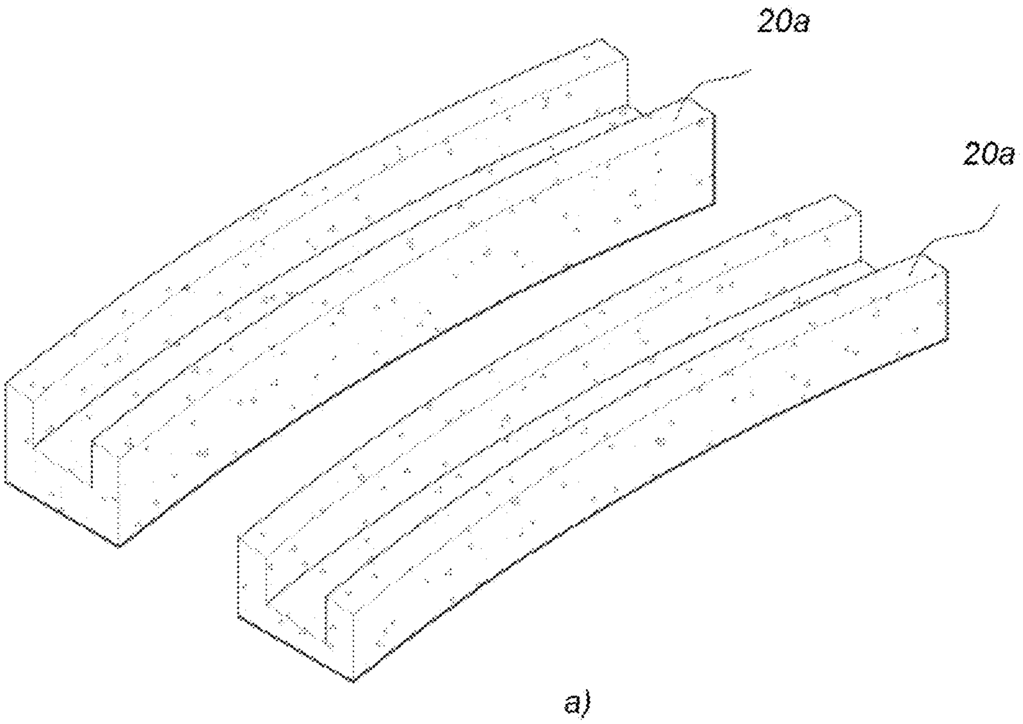
FIG. 5, a) and b) are views illustrating a precast concrete block for a rail-embedded track that is manufactured using the formwork apparatus illustrated in FIG. 3A.
Figure 5:
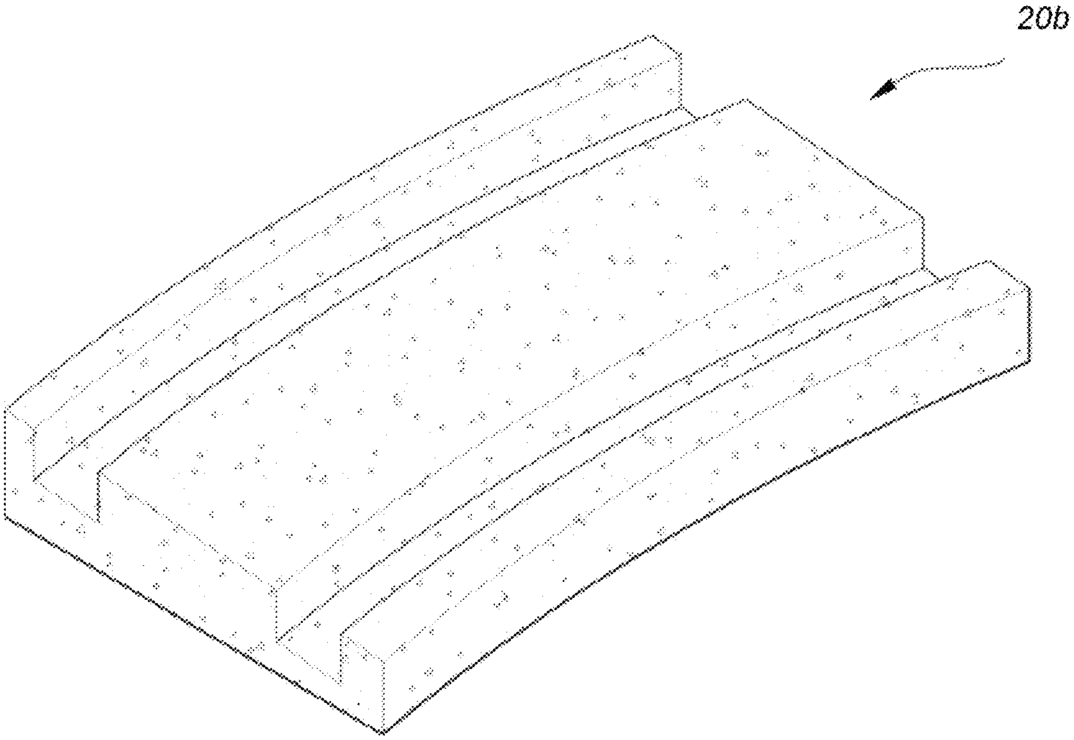
Figure 6:
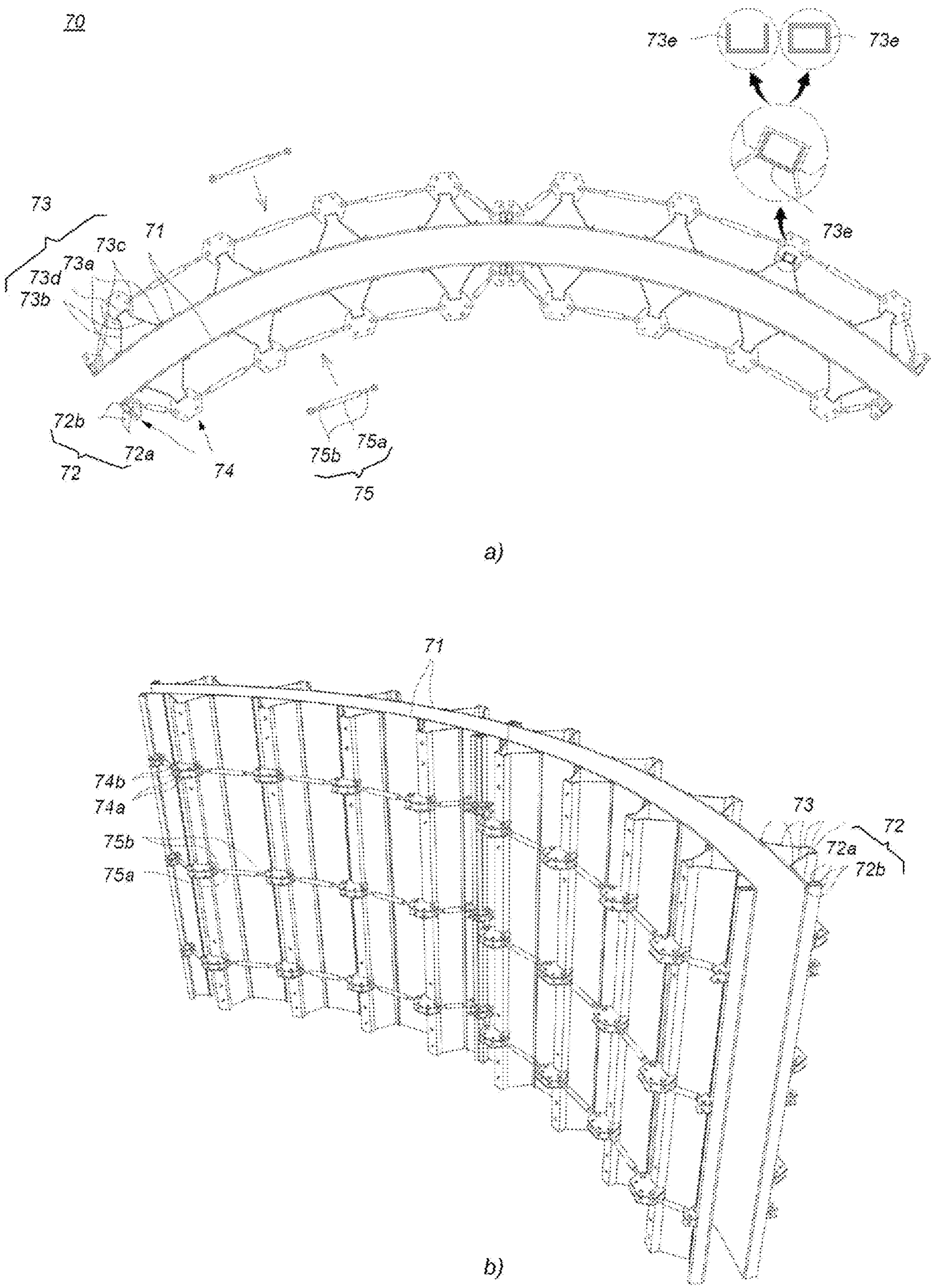
FIG. 6, a) is a cross-sectional view illustrating a state in which a curved formwork is manufactured by utilizing a curvature-adjustable concrete structure formwork according to the related art, b) is a perspective view of the curved formwork.

Hereinafter, embodiments of the present disclosure will be described in detail with reference to the accompanying drawings to allow those of ordinary skill in the art to which the present disclosure pertains to easily carry out the embodiments of the present disclosure. However, the present disclosure may be implemented in various different forms and is not limited to the embodiments described herein. Also, in the drawings, parts unrelated to the description are omitted for clarity of the present disclosure, and like parts are denoted by like reference numerals throughout.

Throughout the specification, when a certain part is described as "including" a certain element, this signifies that the certain part may further include another element rather than excluding the other element unless particularly described otherwise.

[Curve Portion Mold Structure for Manufacturing Curved Concrete Panel for Mountain Railway Rack Track]

Figure 7:
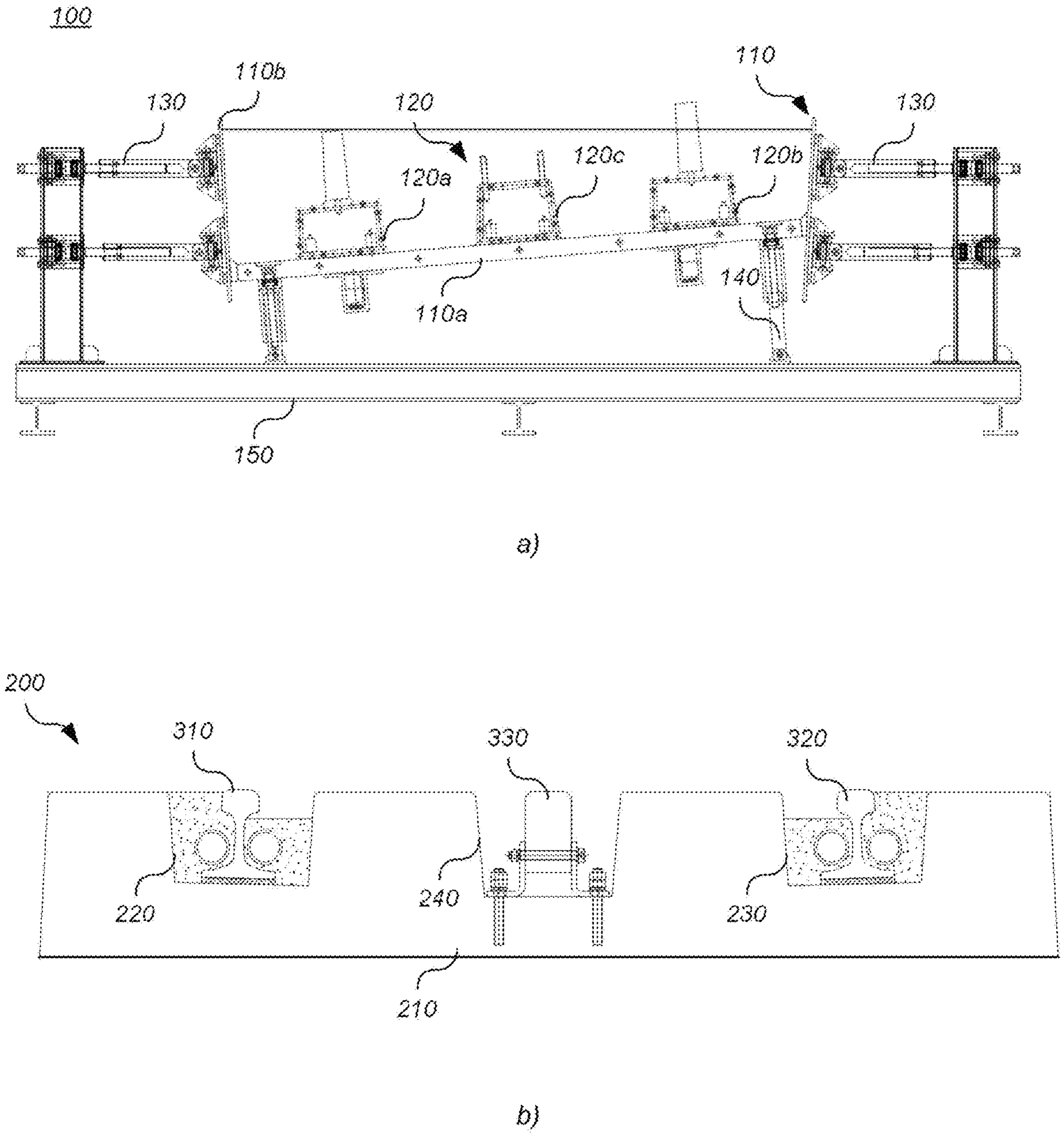
FIG. 7 is a view illustrating a curve portion mold structure for manufacturing a curved concrete panel for a mountain railway rack track according to an embodiment of the present disclosure.

FIG. 7 is a view illustrating a curve portion mold structure for manufacturing a curved concrete panel for a mountain railway rack track according to an embodiment of the present disclosure, wherein a) of FIG. 7 is a lateral cross-sectional view illustrating the curve portion mold structure, and b) of FIG. 7 is a lateral cross-sectional view illustrating the curved concrete panel.

Referring to a) and b) of FIG. 7, a curve portion mold structure 100 for manufacturing a curved concrete panel for a mountain railway rack track according to an embodiment of the present disclosure is configured to include an outer mold 110, an inner mold 120, a side screw jack 130, and a bottom plate slope adjustment device 140.

Here, the curve portion mold structure 100 may also be referred to as a curve portion mold.

Here, the outer mold 110 may include a bottom plate mold 110*a* (or lower mold 110*a*) and a sidewall mold 110*b* (or side mold 110*b*), and the outer mold 110 may include an end mold installed at both ends thereof in the longitudinal direction.

Also, the inner mold 120 may include a left rail installation convex portion 120*a*, a right rail installation convex portion 120*b*, and a rack installation convex portion 120*c*.

The outer mold 110 is made of the bottom plate mold 110*a* and the sidewall mold 110*b*, and the bottom plate mold 110*a* is disposed to be divided. Here, the sidewall mold 110*b* is installed at both sidewalls of the curve portion mold. The inner mold 120 is disposed on the bottom plate mold 110*a* of the outer mold 110 to form left and right rail installation blockouts 220 and 230 and a rack installation blockout 240 of a curved concrete panel 200.

Here, as will be described below, the curvature of the inner mold 120 may be adjusted by connecting an intermediate block 121, an end block 122, and an impact-absorbing block 123 of the inner mold 120 and absorbing a change in an angle due to the curvature.

The side screw jack 130 is installed at a side surface of the sidewall mold 110*b* of the outer mold 110 on a worktable 150 for manufacturing the curved concrete panel 200 and implements a curve of the sidewall mold 110*b* by adjusting an introduced pressure.

The bottom plate slope adjustment device 140 adjusts a slope by being attached to a bottom surface of the bottom plate mold 110*a* of the outer mold 110 to form a bottom of the curved concrete panel 200.

Specifically, for example, the curve portion mold structure 100 for manufacturing a curved concrete panel for a mountain railway rack track according to an embodiment of the present disclosure may be manufactured to have a length of 2,400 mm, a width of 3,100 mm, and a height of 950 mm, but the size is not limited thereto.

Also, in order to implement a curve with a minimum radius of curvature of m at the side surface of the curve portion mold, the side screw jack 130 capable of introducing pressure is applied.

Also, when manufacturing the curve portion mold structure 100, by making a bottom surface of the curve portion mold structure 100 that corresponds to an upper surface of the curved concrete panel 200 to face downward, the curve portion mold structure 100 is removed by reversing the curved concrete panel 200 after pouring concrete 210 in the curve portion mold structure 100 and curing the concrete 210.

Also, a slope (cant) of 8% at maximum can be implemented by enabling adjustment of a slope of the bottom plate mold 110*a* of the outer mold 110, but the present disclosure is not limited thereto.

Specifically, as illustrated in b) of FIG. 7, the inner mold 120 includes the left rail installation convex portion 120*a* for forming the left rail installation blockout 220 of the curved concrete panel 200, the right rail installation convex portion 120*b* for forming the right rail installation blockout 230, and the rack installation convex portion 120*c* disposed between the left and right rail installation convex portions 120*a* and 120*b* to form the rack installation blockout 240.

Here, the blockout is a portion where concrete is not poured in the process of manufacturing a concrete panel and is also referred to as a core.

Also, in the case of the inner mold 120, a rack installation shear anchor, which is a shear anchor pre-embedded in the curved concrete panel 200, may be installed on the rack installation convex portion 120*c*.

Figure 13:
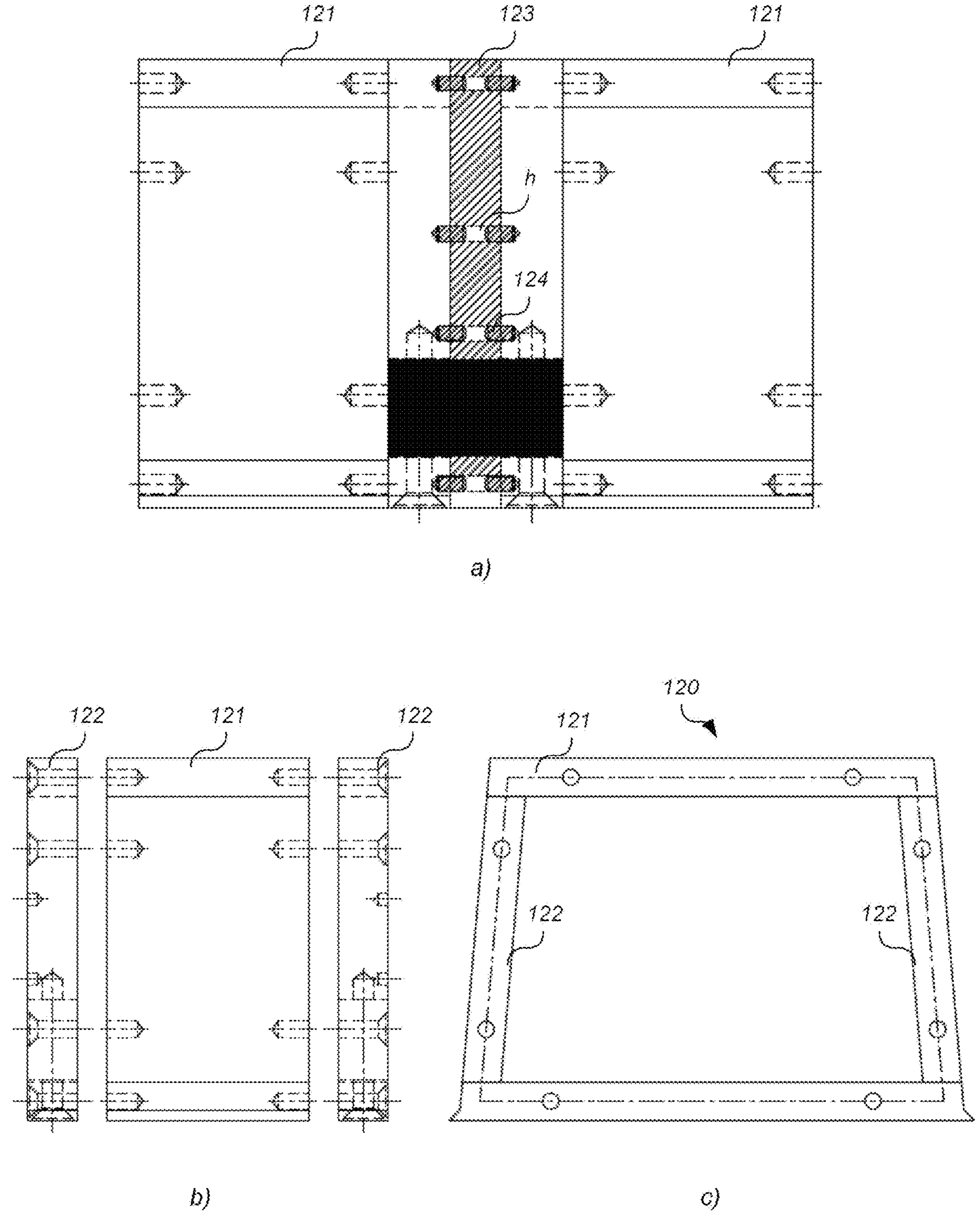
FIG. 13 is a view illustrating an impact-absorbing block, an intermediate block, and an end block in the inner block of the curve portion mold structure for manufacturing a curved concrete panel for a mountain railway rack track according to an embodiment of the present disclosure.

Also, mortar, which is a bedding material, may be injected so that a bottom surface of the curved concrete panel 200 and a concrete base layer are integrated, and a bedding material inlet forming material may be installed on each of the left and right rail installation convex portions 120*a* and 120*b* to form the bedding material inlet. In particular, an impact-absorbing block is applied between several blocks as illustrated in FIG. 13, which will be described below, to enable introduction of an angle of change according to the curvature of the inner mold 120.

Also, as illustrated in b) of FIG. 7, the curved concrete panel 200 is formed by pouring the concrete 210 to form the left rail installation blockout 220, the right rail installation blockout 230, and the rack installation blockout 240 and is constructed to be integrated with the concrete base layer formed on the ground through mortar injected through the bedding material inlet.

Also, in the left rail installation blockout 220, a left rail 310 may be coupled through a shear anchor, and in the right rail installation blockout 230, a right rail 320 may be coupled through a shear anchor.

Also, in the rack installation blockout 240, a rack 330 is coupled through the rack installation shear anchor so that a shear anchor can be installed at the right position on the site.

Figure 8:
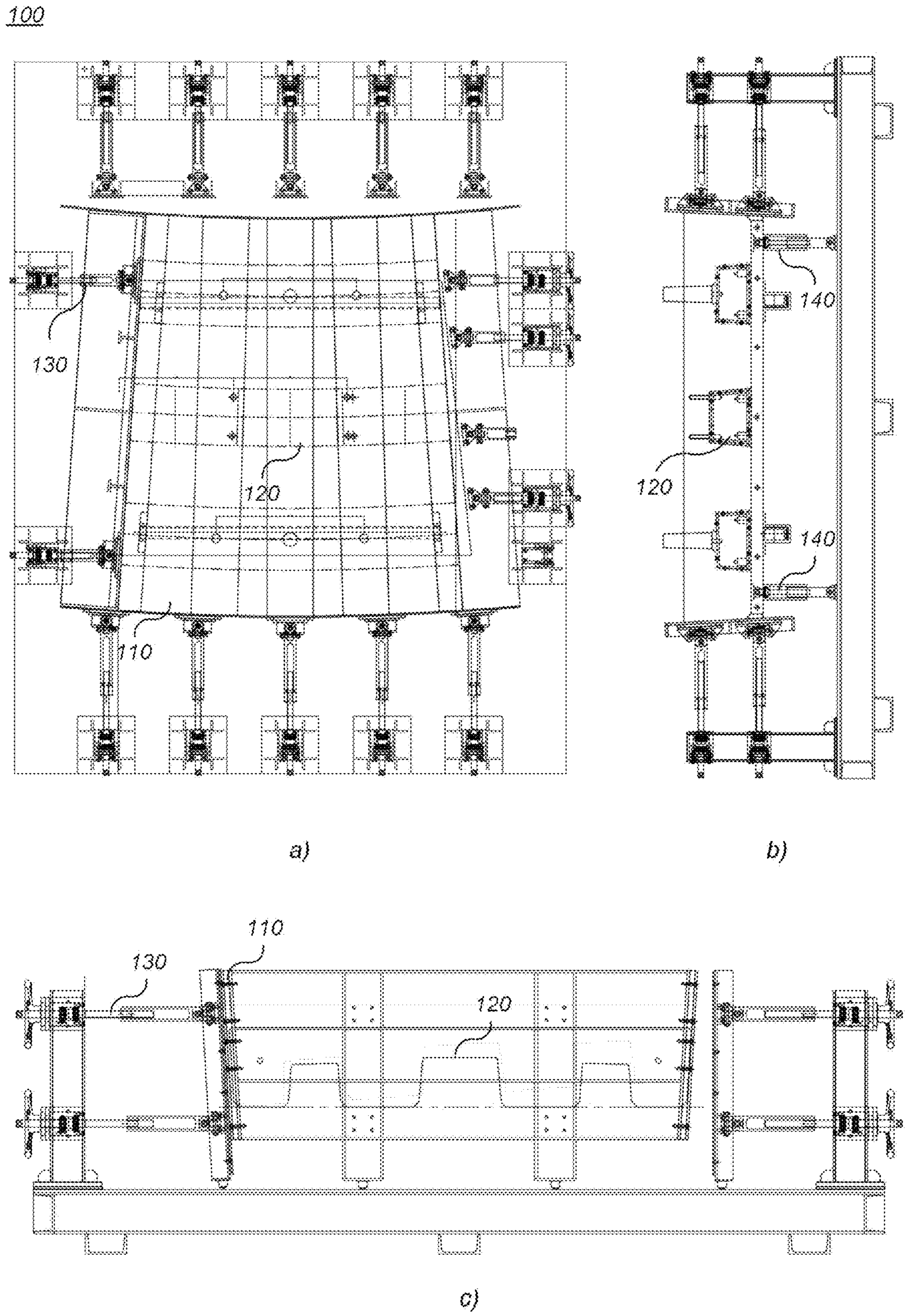
FIG. 8 is a view illustrating a curve portion mold structure for manufacturing a curved concrete panel for a mountain railway rack track according to an embodiment of the present disclosure.

Meanwhile, FIG. 8 is a view illustrating a curve portion mold structure for manufacturing a curved concrete panel for a mountain railway rack track according to an embodiment of the present disclosure, wherein a) of FIG. 8 is a plan view, b) of FIG. 8 is a lateral cross-sectional view, and c) of FIG. 8 is a lateral view.

As illustrated in a) to c) of FIG. 8, the curve portion mold structure 100 for manufacturing a curved concrete panel for a mountain railway rack track according to an embodiment of the present disclosure is made of the outer mold 110 and the inner mold 120, and the curvature of the outer mold 110 may be implemented by a plurality of side screw jacks 130, each configured to introduce a pressure for implementing a curve of the curved concrete panel 200, being applied to a side surface of the outer mold 110.

Also, at a bottom surface of the bottom plate mold 110*a* of the outer mold 110, the bottom plate slope adjustment device 140 that can adjust the slope of the bottom plate is installed to manufacture the curved concrete panel 200.

Figure 10:
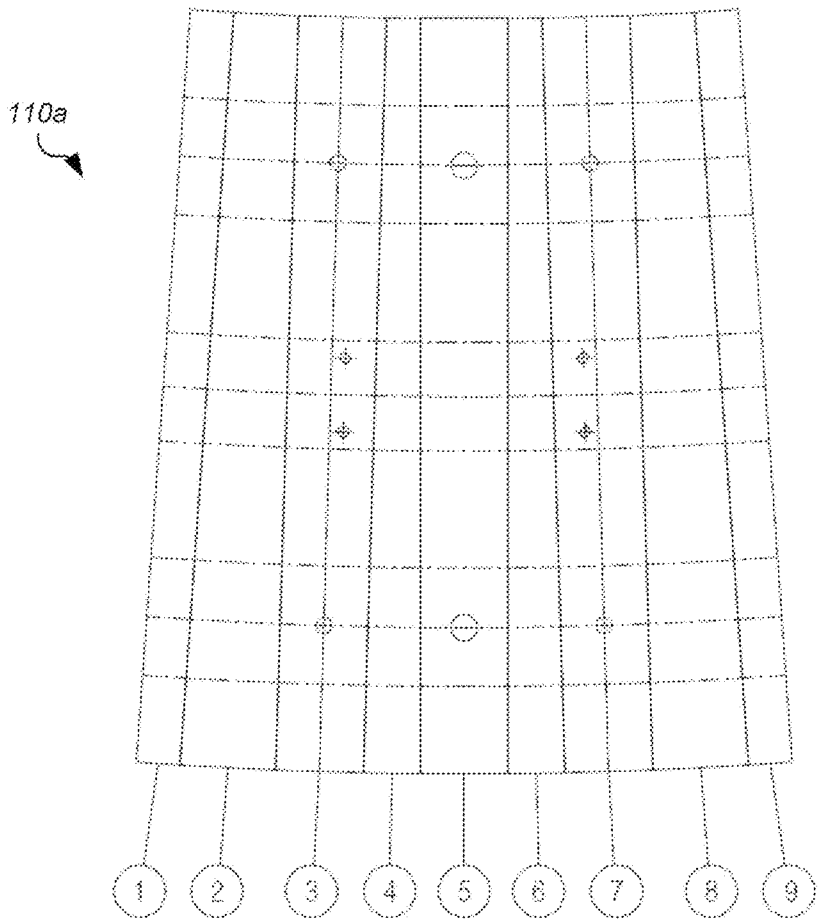
FIG. 10 is a view for describing division of a bottom plate in the curve portion mold structure for manufacturing a curved concrete panel for a mountain railway rack track according to an embodiment of the present disclosure.
Figure 10:
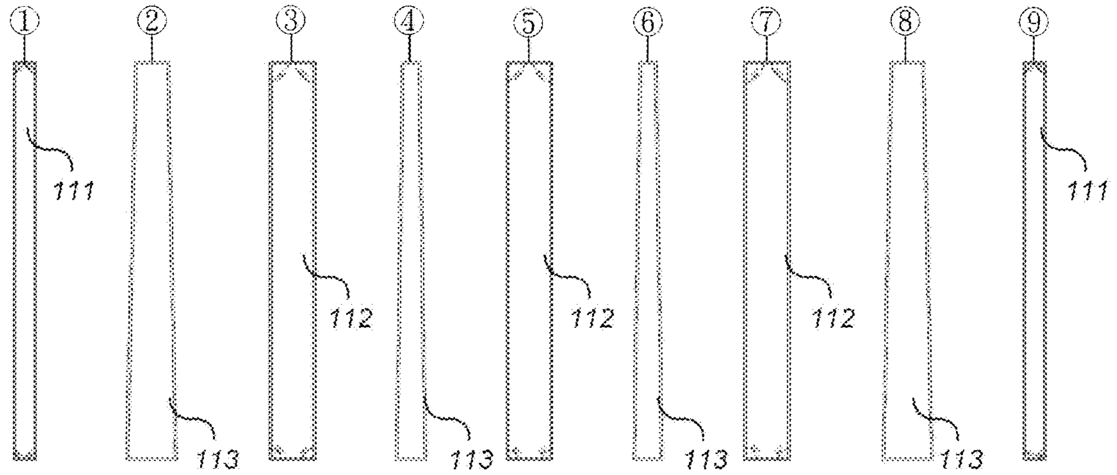

Here, in the case of the outer mold 110, as illustrated in FIG. 10 which will be described below, the bottom plate mold 110*a* is formed by dividing the bottom plate in order to allow application to various forms of curvatures, and in the bottom plate mold 110*a*, as illustrated in b) of FIG. 10, an end bottom plate mold 111 disposed at an end and an intermediate bottom plate mold 112 disposed at an intermediate portion are manufactured with a fixed size, and the remaining bottom plate mold is a variable bottom plate mold 113 to which a variable size is applied according to the curvature of the curved concrete panel 200.

Also, as illustrated in FIG. 13 which will be described below, the curvature of the inner mold 120 is implemented by connecting the intermediate block 121 made of a steel material, the end block 122 made of a steel material, and the impact-absorbing block 123 made of rubber to each other, and as a configuration for connecting the blocks, a fastening hole h is formed in an end surface of each block to fasten the blocks in the form of a fastening pin 124 and couple the blocks to each other.

Figure 9:
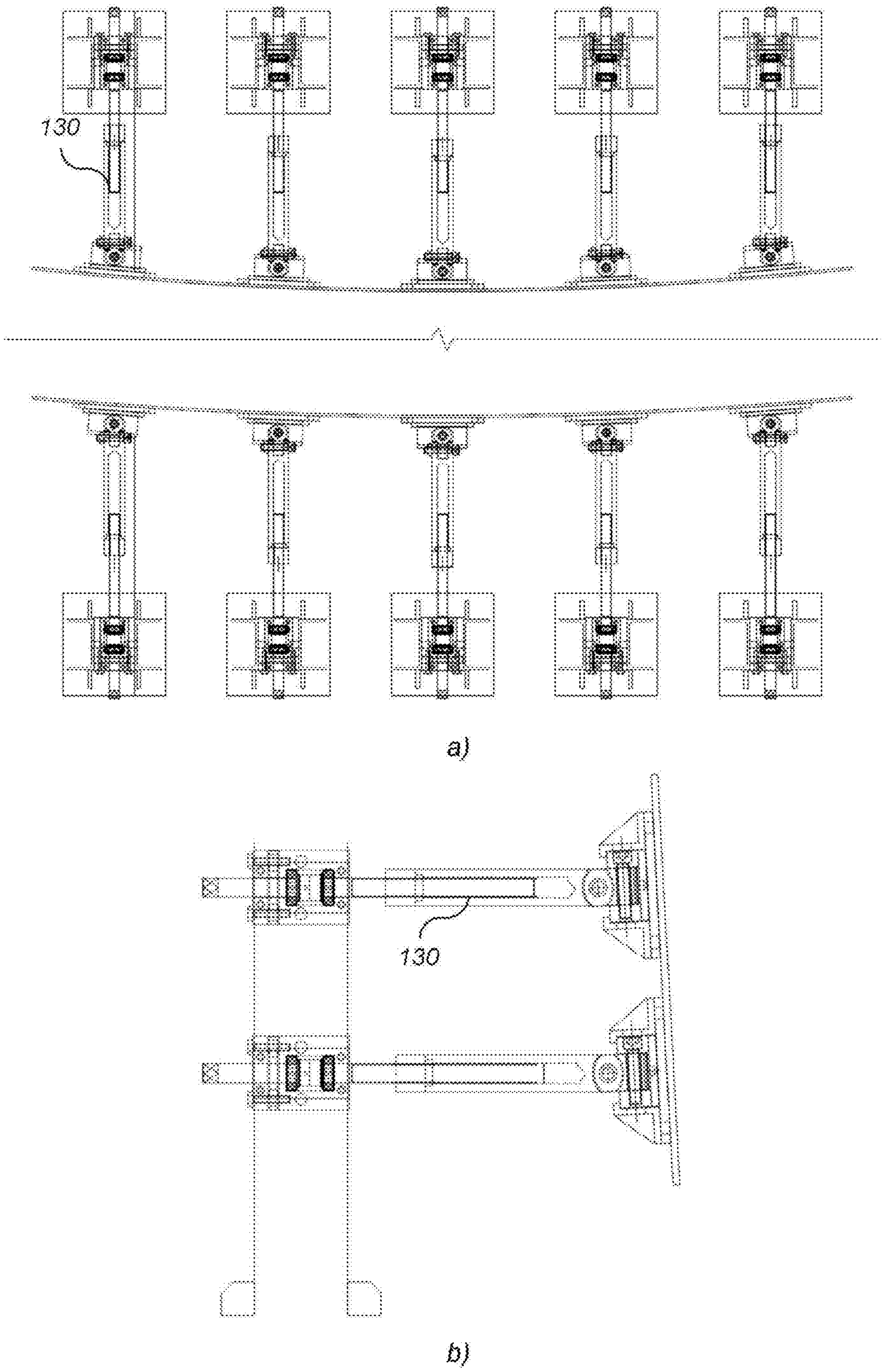
FIG. 9 is a view illustrating a side screw jack in the curve portion mold structure for manufacturing a curved concrete panel for a mountain railway rack track according to an embodiment of the present disclosure.

Meanwhile, FIG. 9 is a view illustrating a side screw jack in the curve portion mold structure for manufacturing a curved concrete panel for a mountain railway rack track according to an embodiment of the present disclosure.

As illustrated in FIG. 9, in the case of the curve portion mold structure for manufacturing a curved concrete panel for a mountain railway rack track according to an embodiment of the present disclosure, the curve of the curved concrete panel 200 may be implemented by a side screw jack, configured to introduce a pressure for implementing the curve, being applied to a side surface of the outer mold 110.

In the case of the curve portion mold structure for manufacturing a curved concrete panel for a mountain railway rack track according to an embodiment of the present disclosure, an introduced pressure is adjusted for each position of the side screw jack 130 to implement the shape of a panel according to a curve while maintaining an inner width of the curved concrete panel 200.

Also, in order to implement a side slope of the curved concrete panel 200 according to a difference between an upper width and a lower width, an introduced pressure of each of an upper screw jack and a lower screw jack that correspond to sidewall molds 110*b* is adjusted. Accordingly, a pressure may be introduced according to a pressure difference for each position of a screw jack due to application of a plane curve and a pressure difference for implementing a sidewall slope.

Meanwhile, FIG. 10 is a view for describing division of a bottom plate in the curve portion mold structure for manufacturing a curved concrete panel for a mountain railway rack track according to an embodiment of the present disclosure.

As illustrated in FIG. 10, in the curve portion mold structure for manufacturing a curved concrete panel for a mountain railway rack track according to an embodiment of the present disclosure, the bottom plate mold 110*a* of the outer mold 110 is divided to allow application to various forms of curvatures.

That is, in the outer mold 110, the bottom plate mold 110*a* is divided into at least a plurality of pieces to allow application to various forms of curvatures, and in this way, as illustrated in b) of FIG. 10, the end bottom plate mold 111 disposed at an end and the intermediate bottom plate mold 112 disposed at an intermediate portion are manufactured with a fixed size, and a size that varies according to the curvature of the curved concrete panel 200 is applied to the remaining variable bottom plate mold 113.

Specifically, the bottom plate mold 110*a* is divided in consideration of application of various forms of curvature to the curved concrete panel 200 and installation of a filling hole and an insert. Here, the bottom plate mold 110*a* is described as being divided into nine bottom plate molds, but the present disclosure is not limited thereto.

For example, a first bottom plate mold and a ninth bottom plate mold, which are end bottom plate molds 111 disposed at an end, and a third bottom plate mold, a seventh bottom plate mold, and a fifth bottom plate mold, which are intermediate bottom plate molds 112 disposed at an intermediate portion, are manufactured with a fixed size. Also, a variable size is applied to variable bottom plate molds 113 other than the end bottom plate molds 111 and the intermediate bottom plate molds 112.

That is, the size of each of a second bottom plate mold, a fourth bottom plate mold, a sixth bottom plate mold, and an eighth bottom plate mold may be adjusted as necessary according to a designed curvature, and here, a plate having a predetermined thickness may be manufactured into the variable bottom plate molds 113 through laser cutting.

In particular, by applying an impact-absorbing material that accommodates a displacement of 2 to 3 mm to the bottom plate molds manufactured with a fixed size in order to absorb an amount of compression through a change in volume, it is possible to minimize the number of pieces into which the overall bottom plate mold is divided that are manufactured with a variable size.

Figure 11:
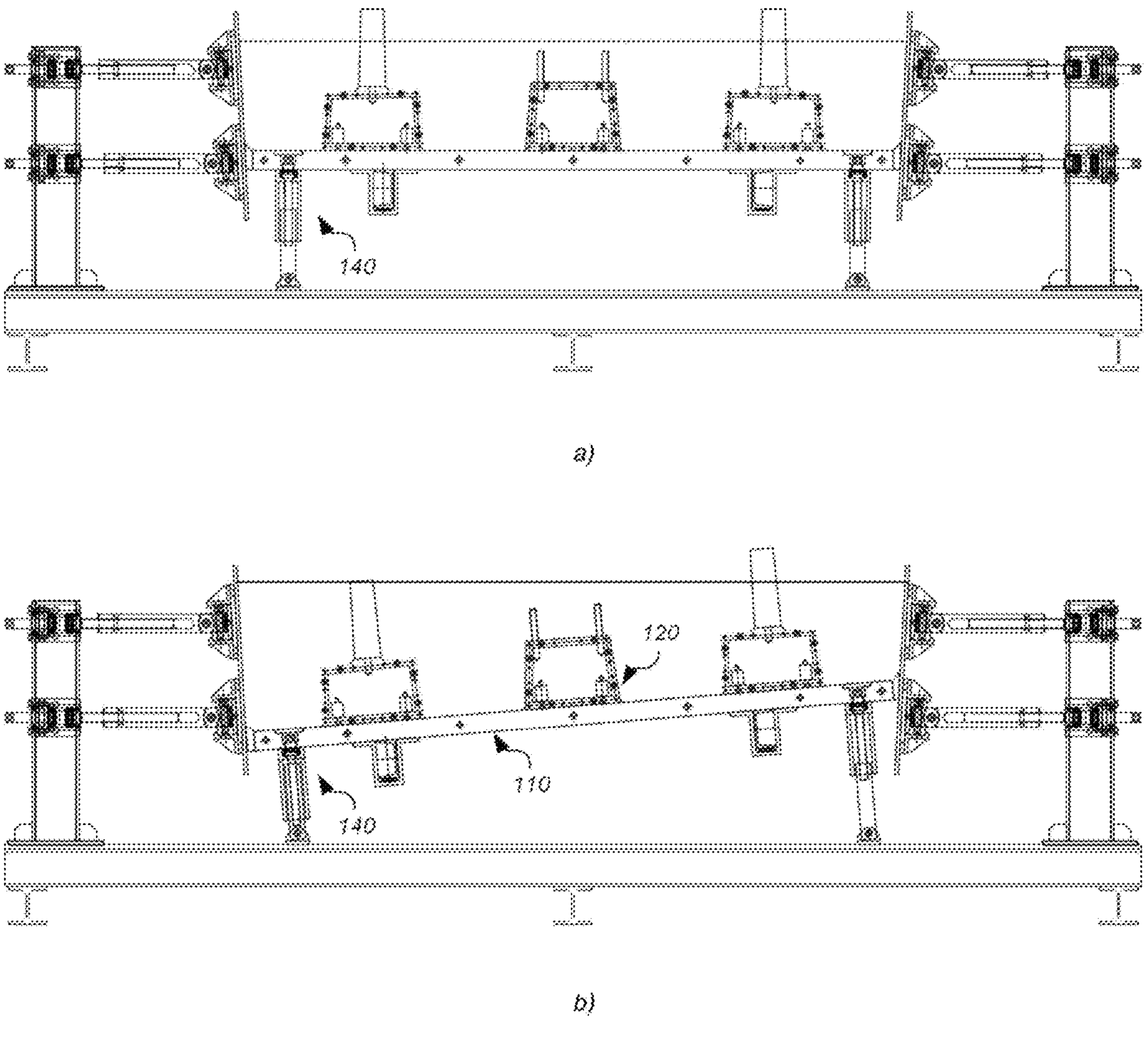
FIG. 11 is a view for describing adjustment of superelevation of the bottom plate in the curve portion mold structure for manufacturing a curved concrete panel for a mountain railway rack track according to an embodiment of the present disclosure.

Meanwhile, FIG. 11 is a view for describing adjustment of a slope of the bottom plate in the curve portion mold structure for manufacturing a curved concrete panel for a mountain railway rack track according to an embodiment of the present disclosure.

a) of FIG. 11 illustrates the shape of the bottom plate when a slope (cant) is not applied, and b) of FIG. 11 shows the shape of the bottom plate when the maximum cant is applied.

The curve portion mold structure for manufacturing a curved concrete panel for a mountain railway rack track according to an embodiment of the present disclosure is configured so that the slope of the bottom plate can be adjusted to manufacture the curved concrete panel 200 on the bottom surface of the outer mold 110.

In the case of the curve portion mold structure for manufacturing a curved concrete panel for a mountain railway rack track according to an embodiment of the present disclosure, as described above, the bottom plate mold 110*a* is divided into a plurality of pieces, and the bottom plate slope adjustment device 140, which is a height control device, is applied to ends (a start point and an end point).

Here, the slope of the bottom plate may be adjusted by adjusting four screws at each corner to adjust heights of a left side and a right side. For example, as illustrated in b) of FIG. 11, a cant of 8% at maximum may be applied as the slope of the bottom plate, but the present disclosure is not limited thereto.

Figure 12:
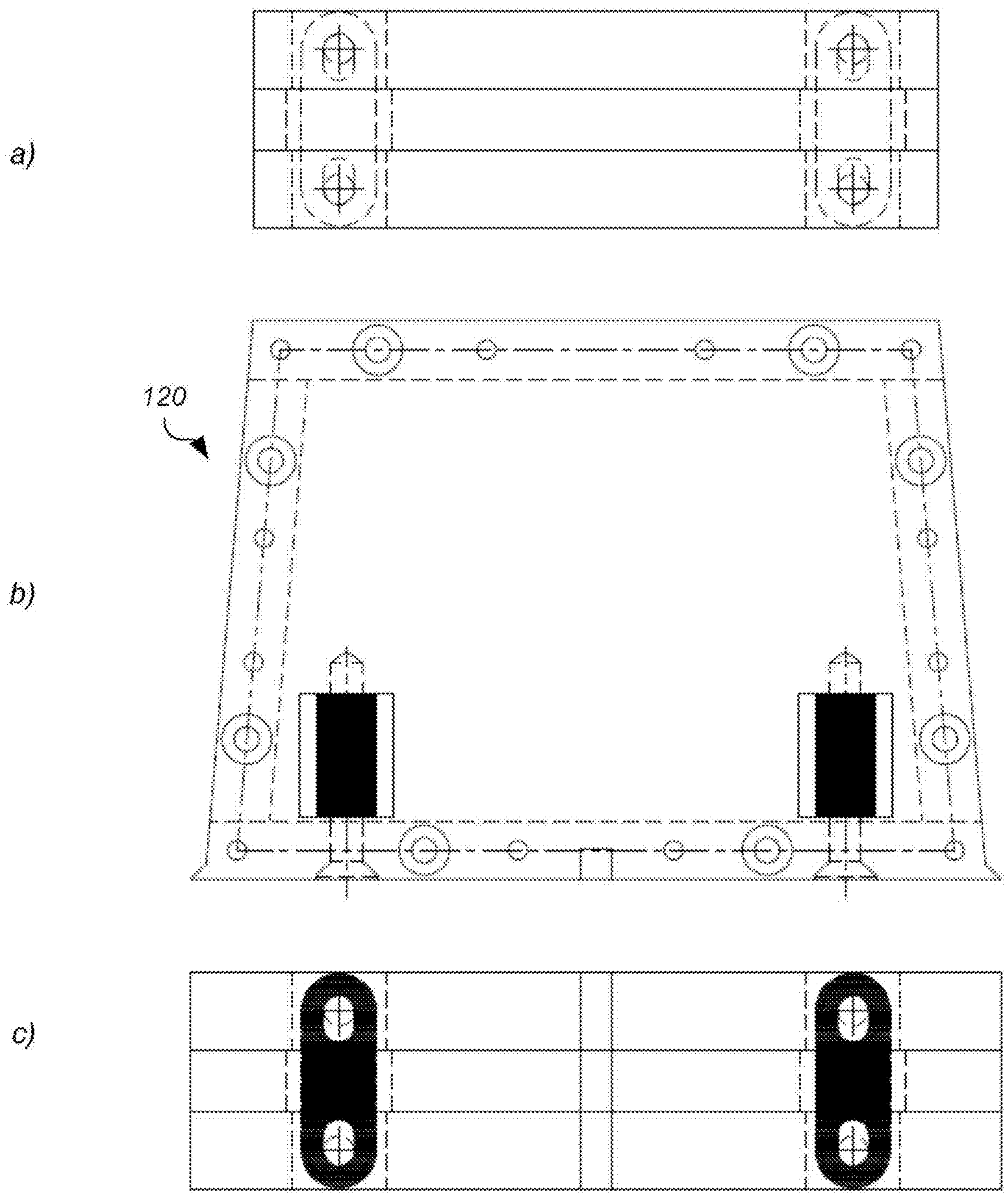
FIG. 12 is a view illustrating an inner block in the curve portion mold structure for manufacturing a curved concrete panel for a mountain railway rack track according to an embodiment of the present disclosure.
Figure 14:
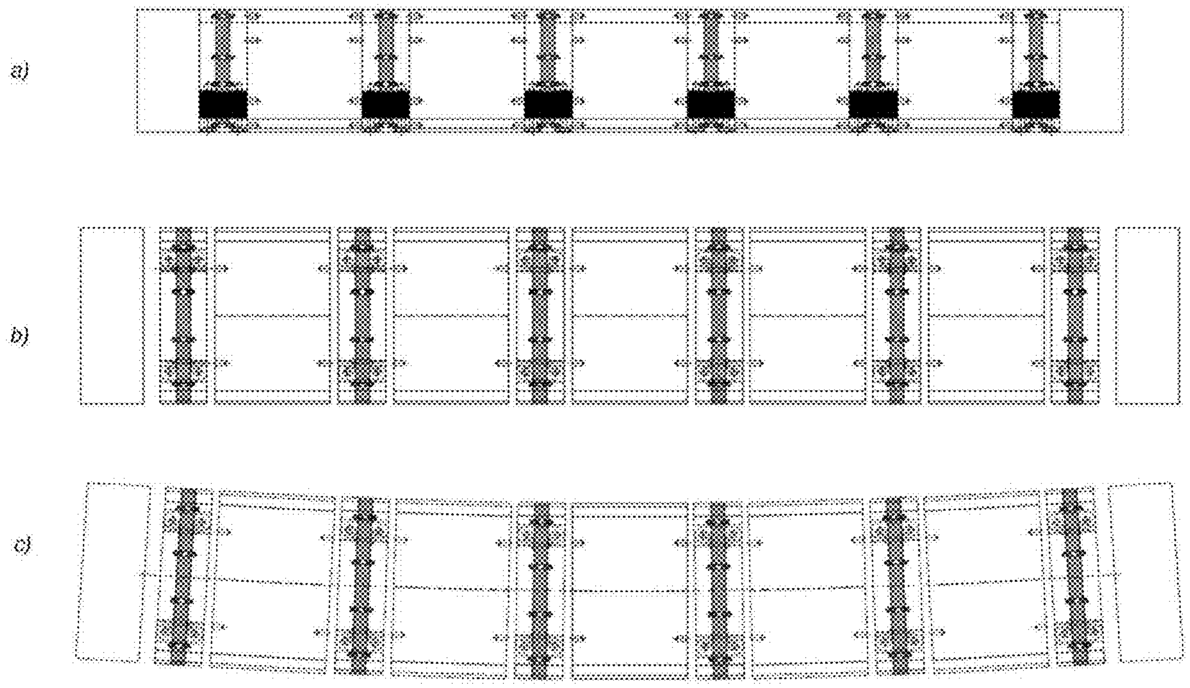
FIG. 14 is a view for describing implementation of a curvature of an inner mold in the curve portion mold structure for manufacturing a curved concrete panel for a mountain railway rack track according to an embodiment of the present disclosure.

Meanwhile, FIG. 12 is a view illustrating an inner block in the curve portion mold structure for manufacturing a curved concrete panel for a mountain railway rack track according to an embodiment of the present disclosure, FIG. 13 is a view illustrating an impact-absorbing block, an intermediate block, and an end block in the inner block of the curve portion mold structure for manufacturing a curved concrete panel for a mountain railway rack track according to an embodiment of the present disclosure, and FIG. 14 is a view for describing implementation of a curvature of an inner mold in the curve portion mold structure for manufacturing a curved concrete panel for a mountain railway rack track according to an embodiment of the present disclosure.

In the case of the curve portion mold structure for manufacturing a curved concrete panel for a mountain railway rack track according to an embodiment of the present disclosure, as illustrated in FIG. 12, by forming the inner mold 120, the curvature of the inner mold 120 may be implemented.

Here, as illustrated in FIG. 13, the inner mold 120 is made of the intermediate block 121 and the end block 122 which are made of a steel material and the impact-absorbing block 123 made of rubber and is designed to correspond to a change in angle due to the curvature by connecting the intermediate block 121, the end block 122, and the impact-absorbing block 123.

Also, by applying a connection device in the form of a slot hole to control the size of an outer side of the impact-absorbing block 123 to be 20 mm at maximum when coupling the blocks, it is possible to induce compression of an inner side of the curvature by compression according to a change in angle.

Here, the fastening hole h may be formed in an end surface of each block, and the blocks may be coupled to each other through the fastening pin 124.

In this way, in the case of the inner mold 120 in the curve portion mold structure for manufacturing a curved concrete panel for a mountain railway rack track according to an embodiment of the present disclosure, as illustrated in FIG. 14, the curvature of the inner mold 120 may be implemented by fastening the intermediate block 121, the end block 122, and the impact-absorbing block 123 and inducing compression of an inner side of the curvature by compression according to a change in angle.

Figure 15A:
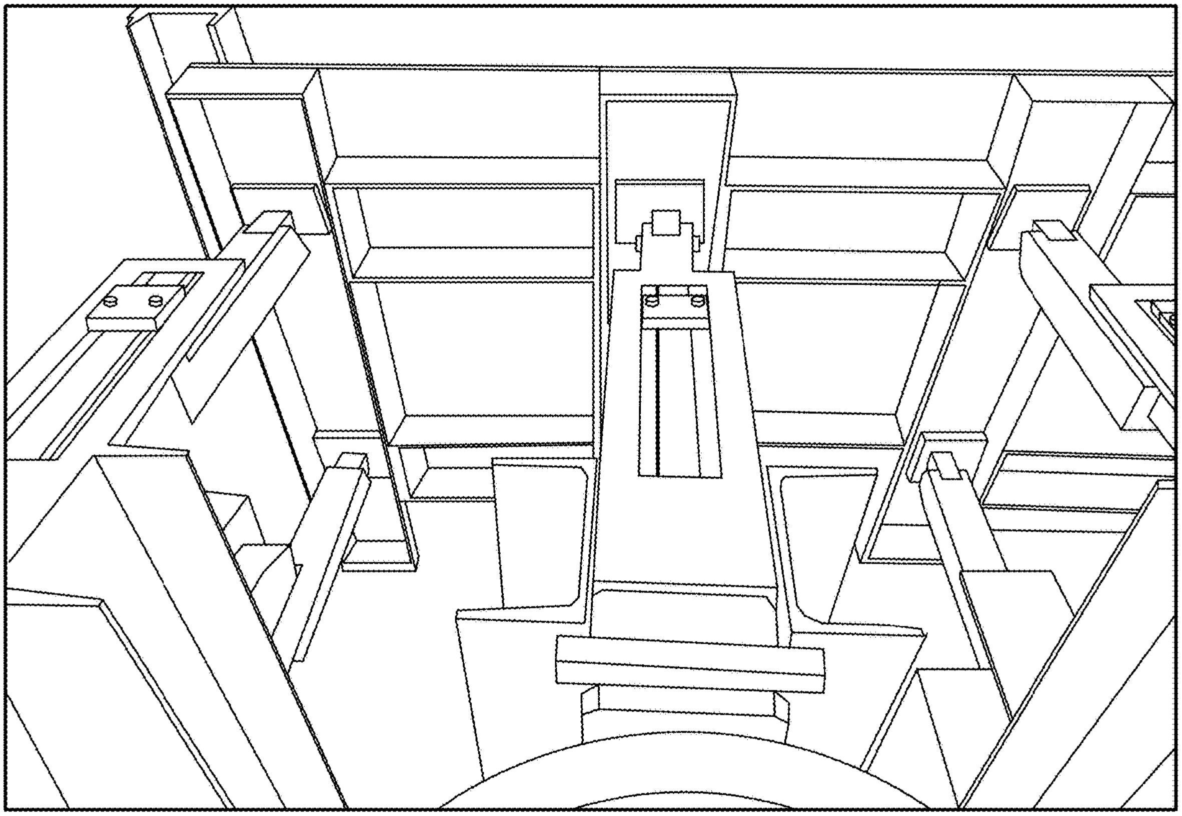
FIGS. 15A and 15B are pictures showing the curve portion mold structure for manufacturing a curved concrete panel for a mountain railway rack track according to an embodiment of the present disclosure.
Figure 15B:
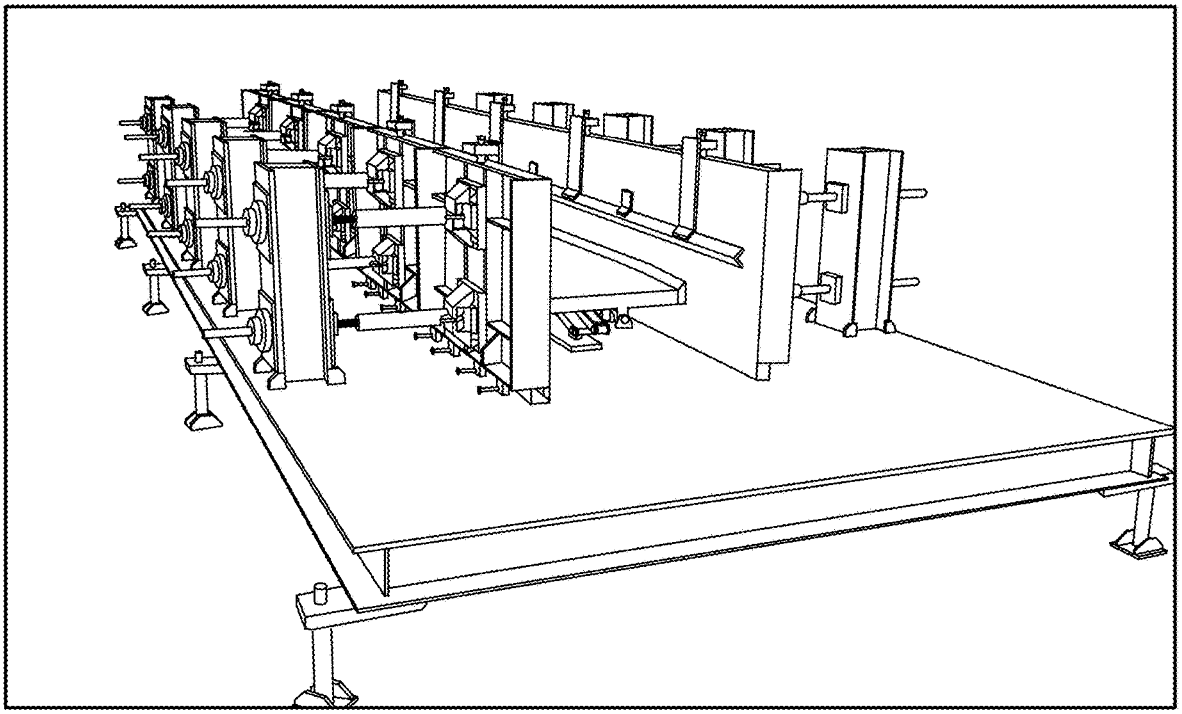

Meanwhile, FIGS. 15A and 15B are pictures showing the curve portion mold structure for manufacturing a curved concrete panel for a mountain railway rack track according to an embodiment of the present disclosure.

FIG. 15A is a picture showing a screw jack in the curve portion mold structure for manufacturing a curved concrete panel for a mountain railway rack track according to an embodiment of the present disclosure, and FIG. 15B is a picture showing an overall view of the curve portion mold structure for manufacturing a curved concrete panel for a mountain railway rack track according to an embodiment of the present disclosure.

As a result, according to the curve portion mold structure for manufacturing a curved concrete panel for a mountain railway rack track according to an embodiment of the present disclosure, by forming the curve portion mold structure made of an outer mold and an inner mold to manufacture a curved concrete panel for a mountain railway rack track, the curvature of the outer mold and the curvature of the inner mold may be simultaneously adjusted, and a curve may be implemented on a side surface of the outer mold by a difference in pressure introduction of a screw jack. Also, by dividing a bottom plate of the outer mold to form a bottom of a curved concrete panel, application to various forms of curvatures of a curved concrete panel is possible.
[Curved concrete panel manufacturing method using curve portion mold structure for mountain railway rack track]FIG. 16 is an operation flowchart showing a curved concrete panel manufacturing method using a curve portion mold structure for a mountain railway rack track according to an embodiment of the present disclosure.

Figure 16:
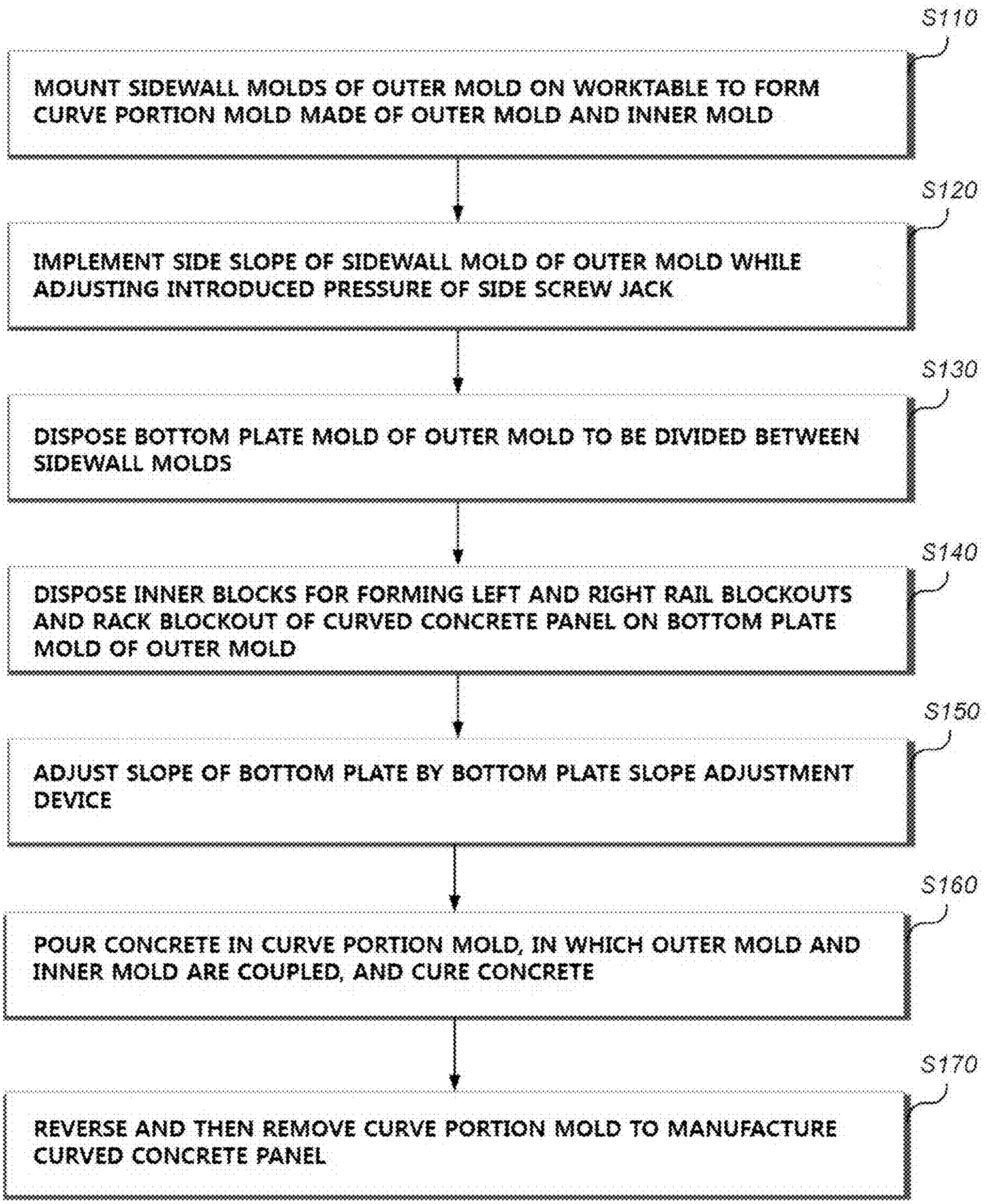
FIG. 16 is an operation flowchart showing a curved concrete panel manufacturing method using a curve portion mold structure for a mountain railway rack track according to an embodiment of the present disclosure.

Referring to FIG. 16, in the curved concrete panel manufacturing method using a curve portion mold structure for a mountain railway rack track according to an embodiment of the present disclosure, first, sidewall molds 110*b* of an outer mold 110 are mounted on a worktable 150 to form a curve portion mold structure made of the outer mold 110 and an inner mold 120 (S110).

Next, a side slope of the sidewall mold 110*b* of the outer mold 110 is implemented while adjusting an introduced pressure of a side screw jack 130 (S120).

Here, a curve may be implemented on a side surface of the outer mold by a difference in pressure introduction of the side screw jack. Also, the side screw jack 130 may introduce a pressure so that a curve with a minimum radius of curvature of 10 m can be implemented on a side surface of the sidewall mold 110*b* of the outer mold 110.

Next, a bottom plate mold 110*a* of the outer mold 110 is disposed to be divided between the sidewall molds 110*b* to form a bottom of a curved concrete panel 200 (S130).

Here, by dividing the bottom plate mold of the outer mold to form the bottom of the curved concrete panel, application to various forms of curvatures of the curved concrete panel is possible.

Next, the inner mold 120 for forming left and right rail installation blockouts 220 and 230 and a rack installation blockout 240 of the curved concrete panel 200 is disposed on the bottom plate mold 110*a* of the outer mold 110 (S140).

Here, the curvature of the inner mold 120 may be adjusted by connecting an intermediate block 121, an end block 122, and an impact-absorbing block 123 of the inner mold 120 and absorbing a change in an angle due to the curvature.

Specifically, the inner mold 120 may include: a left rail installation convex portion 120*a* disposed on the bottom plate mold 110*a* to form the left rail installation blockout 220 of the curved concrete panel 200; a right rail installation convex portion 120*b* disposed on the bottom plate mold 110*a* to form the right rail installation blockout 230 of the curved concrete panel 200; and a rack installation convex portion 120*c* disposed between the left rail installation convex portion 120*a* and the right rail installation convex portion 120*b* to form the rack installation blockout 240 of the curved concrete panel 200. Here, each of the left rail installation convex portion 120*a*, the right rail installation convex portion 120*b*, and the rack installation convex portion 120*c* may include: an intermediate block 121 formed of a steel material and disposed at an intermediate portion; an end block 122 formed of a steel material and disposed at an end; and an impact-absorbing block 123 formed of a rubber material and inserted between blocks, wherein the curvature of the inner mold 120 may be adjusted by connecting the blocks and absorbing a change in an angle due to the curvature of the inner mold 120.

Next, a slope of a bottom plate is adjusted by a bottom plate slope adjustment device 140 (S150). Here, the bottom plate slope adjustment device 140 may adjust the slope of the bottom plate mold 110*a* of the outer mold 110 and may implement a slope (cant) of 8% at maximum.

Next, concrete 210 is poured in a curve portion mold structure 100, in which the outer mold 110 and the inner mold 120 are coupled, and cured (S160).

Next, the curve portion mold structure 100 is reversed and then removed to manufacture the curved concrete panel 200 (S170).

As a result, according to an embodiment of the present disclosure, by implementing a curvature by coupling between blocks using a fastening pin in an inner mold made of an intermediate block, an end block, and an impact-absorbing block, a curved concrete panel for a mountain railway rack track can be easily manufactured.

According to the present disclosure, by forming a curve portion mold structure made of an outer mold and an inner mold to manufacture a curved concrete panel for a mountain railway rack track, the curvature of the outer mold and the curvature of the inner mold can be simultaneously adjusted, and a curve can be implemented on a side surface of the outer mold by a difference in pressure introduction of a screw jack.

According to the present disclosure, by dividing a bottom plate of an outer mold to form a bottom of a curved concrete panel, application to various forms of curvatures of a curved concrete panel is possible.

According to the present disclosure, by implementing a curvature by coupling between blocks using a fastening pin in an inner mold made of an intermediate block, an end block, and an impact-absorbing block, a curved concrete panel for a mountain railway rack track can be easily manufactured.

The above-given description of the present disclosure is merely illustrative, and those of ordinary skill in the art to which the present disclosure pertains should understand that the present disclosure may be easily modified in other specific forms without changing the technical spirit or essential features of the present disclosure. Therefore, the embodiments described above should be understood as being illustrative, instead of limiting, in all aspects. For example, each element described as a single type may also be embodied in a distributed manner, and likewise, elements described as being distributed may also be embodied in a combined form.

The scope of the present disclosure is defined by the appended claims rather than by the detailed description above, and all changes or modifications derived from the meaning and scope of the claims and their equivalents should be interpreted as falling within the scope of the present disclosure.

What is claimed is:

1. A curved concrete panel manufacturing method using a curve portion mold structure for a mountain railway rack track, the curved concrete panel manufacturing method comprising:

a) mounting sidewall molds of an outer mold on a worktable to form a curve portion mold structure made of the outer mold and an inner mold;

b) implementing a side slope of the sidewall mold of the outer mold while adjusting an introduced pressure of a side screw jack;

c) disposing a bottom plate mold of the outer mold to be divided between the sidewall molds to form a bottom of a curved concrete panel;

d) disposing the inner mold for forming left and right rail installation blockouts and a rack installation blockout of the curved concrete panel on the bottom plate mold of the outer mold;

e) adjusting a slope of a bottom plate by a bottom plate slope adjustment device;

f) pouring concrete in a curve portion mold structure, in which the outer mold and the inner mold are coupled, and curing the concrete; and g) flipping over and then removing the curve portion mold structure to manufacture the curved concrete panel, wherein a curvature of the outer mold and a curvature of the inner mold are simultaneously adjusted, and the curvature of the inner mold is adjusted by connecting an intermediate block, an end block, and an impact-absorbing block of the inner mold and absorbing a change in an angle due to the curvature.

2. The curved concrete panel manufacturing method of claim 1, wherein, in operation b), the curvature of the outer mold is implemented by a difference in pressure introduction of the side screw jack at the side surface of the outer mold.

3. The curved concrete panel manufacturing method of claim 1, wherein, in operation c), by dividing the bottom plate mold of the outer mold to form the bottom of the curved concrete panel, application to various forms of curvatures of the curved concrete panel is possible.

4. The curved concrete panel manufacturing method of claim 1, wherein the outer mold includes: the bottom plate mold disposed to be divided for application to various forms of curvatures; and the sidewall molds disposed at both sides of a sidewall and whose side slope is adjusted by the side screw jack.

5. The curved concrete panel manufacturing method of claim 4, wherein the bottom plate mold includes: an end bottom plate mold disposed at both side ends while having a fixed size; an intermediate bottom plate mold disposed at an intermediate portion while having a fixed size; and a variable bottom plate mold to which a variable size is applied according to the curvature of the curved concrete panel.

6. The curved concrete panel manufacturing method of claim 1, wherein, in operation b), the side screw jack introduces a pressure to implement a curve with a minimum radius of curvature of 10 m at the side surface of the sidewall mold of the outer mold.

7. The curved concrete panel manufacturing method of claim 1, wherein, in operation e), the bottom plate slope adjustment device adjusts the slope of the bottom plate mold of the outer mold and implements a slope of 8% at maximum.

8. The curved concrete panel manufacturing method of claim 1, wherein, in operation d), the inner mold includes: a left rail installation convex portion disposed on the bottom plate mold to form the left rail installation blockout of the curved concrete panel; a right rail installation convex portion disposed on the bottom plate mold to form the right rail installation blockout of the curved concrete panel; and a rack installation convex portion disposed between the left rail installation convex portion and the right rail installation convex portion to form the rack installation blockout of the curved concrete panel.

9. The curved concrete panel manufacturing method of claim 8, wherein each of the left rail installation convex portion, the right rail installation convex portion, and the rack installation convex portion includes: an intermediate block formed of a steel material and disposed at an intermediate portion; an end block formed of a steel material and disposed at an end; and an impact-absorbing block formed of a rubber material and inserted between the intermediate block and the end block, wherein the curvature of the inner mold is adjusted by connecting the blocks and absorbing a change in an angle due to the curvature of the inner mold.

10. The curved concrete panel manufacturing method of claim 9, wherein the intermediate block, the end block, and the impact-absorbing block each have a fastening hole formed therein, and the blocks are connected through a fastening pin.

* * * * *